United States Patent
Lin et al.

(10) Patent No.: US 10,681,587 B2
(45) Date of Patent: Jun. 9, 2020

(54) METHOD AND APPARATUS FOR WIRELESS COMMUNICATION

(71) Applicant: HUAWEI TECHNOLOGIES CO., LTD., Shenzhen, Guangdong (CN)

(72) Inventors: Bo Lin, Beijing (CN); Hong Wang, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/991,265

(22) Filed: May 29, 2018

(65) Prior Publication Data
US 2018/0279172 A1     Sep. 27, 2018

Related U.S. Application Data

(63) Continuation of application No. PCT/CN2016/107430, filed on Nov. 28, 2016.

(30) Foreign Application Priority Data

Nov. 30, 2015   (CN) .......................... 2015 1 0849432

(51) Int. Cl.
| | |
|---|---|
| *H04W 28/06* | (2009.01) |
| *H04W 72/04* | (2009.01) |
| *H04W 76/15* | (2018.01) |
| *H04L 5/00* | (2006.01) |
| *H04L 29/06* | (2006.01) |
| *H04W 36/00* | (2009.01) |
| *H04W 88/06* | (2009.01) |

(52) U.S. Cl.
CPC ........... *H04W 28/06* (2013.01); *H04L 5/0051* (2013.01); *H04L 69/22* (2013.01); *H04W 72/0426* (2013.01); *H04W 76/15* (2018.02); *H04W 36/0072* (2013.01); *H04W 88/06* (2013.01)

(58) Field of Classification Search
CPC ............. H04W 36/0072; H04W 28/06; H04W 72/0426; H04W 76/15
See application file for complete search history.

(56) References Cited

U.S. PATENT DOCUMENTS

| | | |
|---|---|---|
| 2008/0305799 A1 | 12/2008 | Zuniga et al. |
| 2009/0016245 A1 | 1/2009 | Karls |

(Continued)

FOREIGN PATENT DOCUMENTS

| | | |
|---|---|---|
| CN | 101690379 A | 3/2010 |
| CN | 103392370 A | 11/2013 |

(Continued)

*Primary Examiner* — Gary Mui
(74) *Attorney, Agent, or Firm* — Womble Bond Dickinson (US) LLP

(57) ABSTRACT

A method and an apparatus for wireless communication are provided. A first network device negotiates with a second network device to determine target data. The first network device supports wireless communication based on a first radio access technology RAT. The second network device supports wireless communication based on a second RAT. The first network device sends based on the first RAT to a terminal device, the target data and RAT type indication information that is used to indicate the second RAT. In this way, user experience can be improved.

16 Claims, 6 Drawing Sheets

(56) References Cited

U.S. PATENT DOCUMENTS

| | | | |
|---|---|---|---|
| 2010/0157943 A1* | 6/2010 | Horn | H04W 36/0005 370/331 |
| 2010/0323700 A1* | 12/2010 | Bachmann | H04W 36/0066 455/436 |
| 2011/0134831 A1 | 6/2011 | Pirskanen | |
| 2012/0188907 A1 | 7/2012 | Dayal et al. | |
| 2013/0088983 A1* | 4/2013 | Pragada | H04W 16/14 370/252 |
| 2014/0293974 A1 | 10/2014 | Chapman et al. | |
| 2014/0329526 A1* | 11/2014 | Sundararajan | H04W 36/24 455/436 |
| 2015/0043479 A1* | 2/2015 | Kitazoe | H04W 72/044 370/329 |
| 2015/0105084 A1* | 4/2015 | Bontu | H04W 36/0072 455/437 |
| 2015/0208311 A1* | 7/2015 | Lee | H04W 24/10 455/436 |
| 2015/0208458 A1 | 7/2015 | Pelletier et al. | |
| 2015/0237645 A1* | 8/2015 | Andrianov | H04W 72/1215 370/329 |
| 2015/0358877 A1* | 12/2015 | Wei | H04W 36/14 370/331 |
| 2016/0088542 A1* | 3/2016 | Belghoul | H04W 28/0268 370/331 |
| 2016/0095034 A1* | 3/2016 | Hampel | H04W 36/14 370/331 |
| 2016/0135100 A1* | 5/2016 | Teyeb | H04W 36/0055 370/331 |
| 2016/0183147 A1* | 6/2016 | Da Silva | H04W 36/0055 370/331 |
| 2017/0026950 A1* | 1/2017 | Cao | H04W 88/10 |
| 2017/0026960 A1* | 1/2017 | Mestanov | H04W 72/0426 |
| 2018/0139675 A1* | 5/2018 | Olofsson | H04L 5/00 |

FOREIGN PATENT DOCUMENTS

| | | |
|---|---|---|
| CN | 103703860 A | 4/2014 |
| CN | 103782651 A | 5/2014 |
| EP | 2772084 A1 | 9/2014 |
| WO | 2013040749 A1 | 3/2013 |
| WO | 2015115983 A1 | 8/2015 |

* cited by examiner

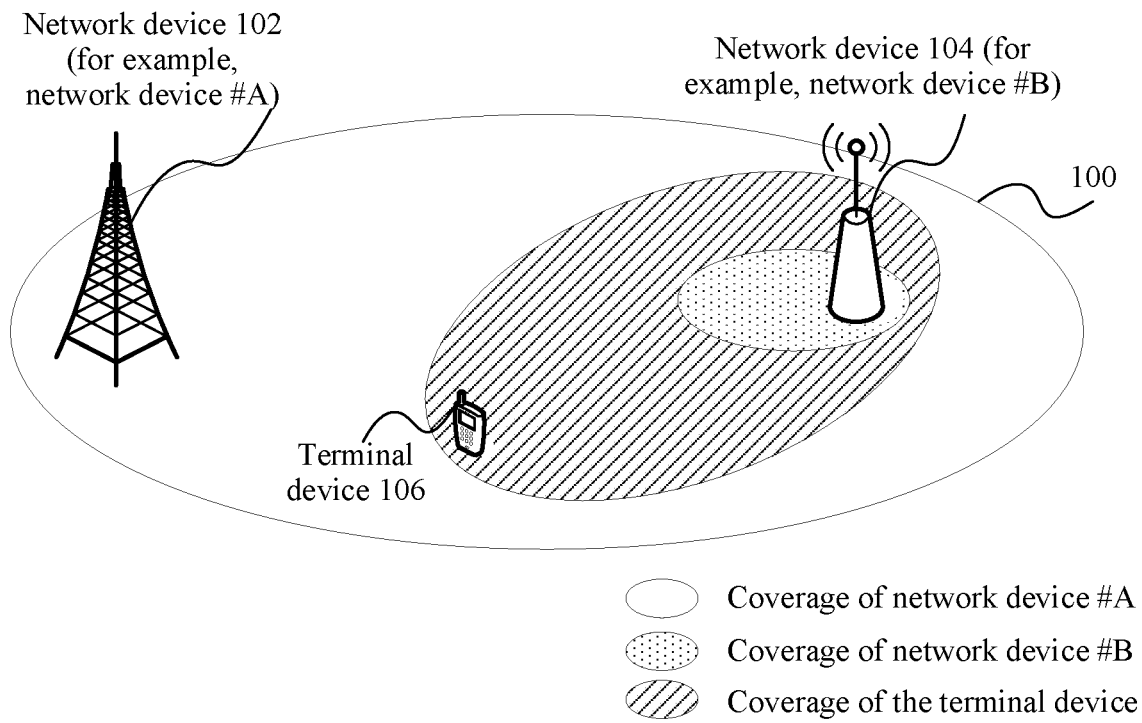

FIG. 1

A first network device negotiates with a second network device to determine target data, wherein the first network device supports wireless communication based on a first radio access technology RAT, and the second network device supports wireless communication based on a second RAT — S210

The first network device sends, based on the first RAT to a terminal device, the target data and RAT type indication information that is used to indicate the second RAT — S220

A second network device negotiates with a first network device, so that the first network device determines target data and sends the target data to a terminal device ~S310

The second network device receives, based on a second RAT and by using a target radio resource, uplink data sent by the terminal device ~S320

A terminal device receives, based on a first RAT, target data and RAT type indication information that are sent by a first network device, wherein the RAT type indication information is used to indicate a second RAT ~S410

The terminal device determines the second RAT based on the RAT type indication information ~S420

The terminal device sends, based on the second RAT and by using a target radio resource, uplink data to a second network device ~S430

FIG. 5

METHOD AND APPARATUS FOR WIRELESS COMMUNICATION

CROSS-REFERENCE TO RELATED APPLICATIONS

This application is a continuation of International Application No. PCT/CN2016/107430, filed on Nov. 28, 2016, which claims priority to Chinese Patent Application No. 201510849432.4, filed on Nov. 30, 2015. The disclosures of the aforementioned applications are hereby incorporated by reference in their entireties.

TECHNICAL FIELD

Embodiments of the present invention relate to the communications field, and more specifically, to a method and an apparatus for wireless communication.

BACKGROUND

In some communications systems (for example, a communications system deployed early), because fewer terminal devices are served by an access network device (for example, a base station), and users have relatively low requirements on service access (for example, a data transmission rate requirement or a data transmission delay), in a configuration of a network device, coverage of a provided network (denoted as a first network for ease of understanding and distinguishing) needs to be considered preferentially, that is, it is expected that the coverage of the first network is expanded as far as possible, so that users within the wider coverage can access the network by using the same network device, and deployment and operation costs are reduced.

With popularity and development of mobile communications, a quantity of users increases continuously. In particular, in some densely populated areas, for example, a large arena, a station, and an airport, more access users need to be accommodated within relatively small coverage. Consequently, overload or the like easily occurs on the network device of the first network, and services cannot be provided normally. This phenomenon severely affects user experience.

To improve user experience, a network device capable of providing a network that has relatively small coverage (denoted as a second network for ease of understanding and distinguishing) may be disposed within the coverage of the first network, allowing terminal devices in the first network to transmit data through the second network, and further reducing load of the network device of the first network.

However, because the coverage of the second network is relatively small, constraints such as movements of the terminal devices and downlink channel quality may make the terminal devices unable to receive data sent by the network device of the second network, and user experience is affected.

SUMMARY

Embodiments of the present invention provide a method and an apparatus for wireless communication, so as to enhance performance of wireless communication and improve user experience.

In one embodiment, a method for wireless communication is provided, and the method includes: negotiating, by a first network device, with a second network device to determine target data, wherein the first network device supports wireless communication based on a first radio access technology RAT, and the second network device supports wireless communication based on a second RAT; and sending, by the first network device based on the first RAT to a terminal device, the target data and RAT type indication information that is used to indicate the second RAT; wherein the target data includes at least one of a plurality of types of data as follows: radio resource indication information, system information of the second network device, radio resource control RRC layer data generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

In one embodiment, when the target data includes the radio resource indication information, the negotiating, by the first network device, with the second network device includes: receiving, by the first network device, first indication information sent by the second network device and used to indicate the radio resources allocated or granted by the second network device; determining, by the first network device based on the first indication information, the target radio resource from the radio resources allocated or granted by the second network device; and generating, by the first network device, the radio resource indication information based on the target radio resource.

In one embodiment, when the target data includes the radio resource indication information, the negotiating, by the first network device, with the second network device includes: sending, by the first network device to the second network device, second indication information used to indicate a data volume of uplink data that the terminal device needs to send to the second network device; receiving, by the first network device, third indication information sent by the second network device based on the second indication information and used to indicate the target radio resource; and generating, by the first network device, the radio resource indication information based on the third indication information.

In one embodiment, a second protocol stack used to perform wireless communication based on the second RAT is provided in the second network device and the terminal device, the target data is generated by the second network device after the second network device performs encapsulation processing by using a second protocol layer set, the second protocol layer set includes at least one protocol layer in the second protocol stack, and a first protocol stack used to perform wireless communication based on the first RAT is provided in the first network device and the terminal device; and before the sending, by the first network device based on the first RAT to the terminal device, the target data and RAT type indication information that is used to indicate the second RAT, the method further includes: receiving, by the first network device, fourth indication information sent by the second network device and used to indicate the second protocol layer set; determining, by the first network device, a first protocol layer set based on the fourth indication information, wherein the first protocol layer set includes at least one protocol layer in the first protocol stack; and performing, by the first network device, encapsulation processing on the target data based on the first protocol layer set.

In one embodiment, before the sending, by the first network device based on the first RAT to the terminal device, the target data and RAT type indication information that is used to indicate the second RAT, the method further includes: performing, by the first network device based on the first protocol layer set, encapsulation processing on the RAT type indication information that is used to indicate the second RAT.

In one embodiment, the method further includes: sending, by the first network device based on the first RAT to the terminal device, the fourth indication information used to indicate the second protocol layer set.

In one embodiment, a method for wireless communication is provided, and the method includes: negotiating, by a second network device, with a first network device, so that the first network device determines target data and sends the target data to a terminal device, wherein the first network device supports wireless communication based on a first radio access technology RAT, and the second network device supports wireless communication based on a second RAT; wherein the target data includes at least one of a plurality of types of data as follows: radio resource indication information, system information of the second network device, radio resource control RRC layer data generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

In one embodiment, when the target data includes the radio resource indication information, the negotiating, by the second network device, with the first network device includes: sending, by the second network device to the first network device, first indication information used to indicate the radio resources allocated or granted by the second network device.

In one embodiment, when the target data includes the radio resource indication information, the negotiating, by the second network device, with the first network device includes: receiving, by the second network device, second indication information sent by the first network device and used to indicate a data volume of uplink data that the terminal device needs to send to the second network device; determining, by the second network device, the target radio resource based on the second indication information; and sending, by the second network device to the first network device, third indication information used to indicate the target radio resource.

In one embodiment, when the target data includes the radio resource indication information, the method further includes: receiving, by the second network device based on the second RAT and by using the target radio resource, the uplink data sent by the terminal device.

In one embodiment, a second protocol stack used to perform wireless communication based on the second RAT is provided in the second network device and the terminal device; and the negotiating, by the second network device, with the first network device includes: determining, by the second network device, a second protocol layer set, wherein the second protocol layer set includes at least one protocol layer in the second protocol stack; performing, by the second network device, encapsulation processing based on the second protocol layer set to generate the target data; and sending, by the second network device to the first network device, the target data and fourth indication information used to indicate the second protocol layer set.

In one embodiment t, a method for wireless communication is provided, and performed in a communications system including at least two network devices, wherein the first network device supports wireless communication based on a first radio access technology RAT, the second network device supports wireless communication based on a second RAT, and the method includes: receiving, by a terminal device based on the first RAT, target data and RAT type indication information that are sent by the first network device, wherein the RAT type indication information is used to indicate the second RAT; wherein the target data includes at least one of a plurality of types of data as follows: radio resource indication information, system information of the second network device, radio resource control RRC layer data generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

In one embodiment, when the target data includes the radio resource indication information, the method further includes: determining, by the terminal device, the second RAT based on the RAT type indication information; and sending, by the terminal device based on the second RAT and by using the target radio resource, uplink data to the second network device.

In one embodiment, the method further includes: determining, by the terminal device based on the RAT type indication information, a second protocol stack corresponding to the second RAT; determining, by the terminal device, a second protocol layer set from the second protocol stack, wherein the second protocol layer set includes at least one protocol layer in the second protocol stack; and performing, by the terminal device, decapsulation processing on the target data based on a first protocol layer set and the second protocol layer set, wherein the first protocol layer set includes at least one protocol layer in a first protocol stack corresponding to the first RAT.

In one embodiment, the determining, by the terminal device, the second protocol layer set from the second protocol stack includes: determining, by the terminal device, the second protocol layer set from the second protocol stack based on the protocol layer that is in the first protocol stack and is used when the RAT type indication information is obtained.

In one embodiment, the determining, by the terminal device, the second protocol layer set from the second protocol stack includes: receiving, by the terminal device based on the first RAT, fourth indication information sent by the first network device and used to indicate the second protocol layer set; and determining, by the terminal device, the second protocol layer set from the second protocol stack based on the fourth indication information.

In one embodiment, an apparatus for wireless communication is provided, and the apparatus includes: a determining unit, configured to control a transceiver unit to negotiate with a second network device to determine target data, wherein the apparatus supports wireless communication based on a first radio access technology RAT, and the second network device supports wireless communication based on a second RAT; and the transceiver unit, configured to send, based on the first RAT to a terminal device, the target data and RAT type indication information that is used to indicate the second RAT; wherein the target data includes at least one of a plurality of types of data as follows: radio resource indication information, system information of the second network device, radio resource control RRC layer data generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

In one embodiment, when the target data includes the radio resource indication information, the transceiver unit is specifically configured to receive first indication information sent by the second network device and used to indicate the radio resources allocated or granted by the second network device; and the determining unit is specifically configured to determine, based on the first indication information, the target radio resource from the radio resources allocated or granted by the second network device, and generate the radio resource indication information based on the target radio resource.

In one embodiment, when the target data includes the radio resource indication information, the transceiver unit is specifically configured to send, to the second network device, second indication information used to indicate a data volume of uplink data that the terminal device needs to send to the second network device; the transceiver unit is specifically configured to receive third indication information sent by the second network device based on the second indication information and used to indicate the target radio resource; and the determining unit is specifically configured to generate the radio resource indication information based on the third indication information.

In one embodiment, a second protocol stack used to perform wireless communication based on the second RAT is provided in the second network device and the terminal device, the target data is generated by the second network device after the second network device performs encapsulation processing by using a second protocol layer set, the second protocol layer set includes at least one protocol layer in the second protocol stack, and a first protocol stack used to perform wireless communication based on the first RAT is provided in the apparatus and the terminal device; the transceiver unit is further configured to receive fourth indication information sent by the second network device and used to indicate the second protocol layer set; the determining unit is further configured to determine a first protocol layer set based on the fourth indication information, wherein the first protocol layer set includes at least one protocol layer in the first protocol stack; and the transceiver unit is further configured to perform encapsulation processing on the target data based on the first protocol layer set.

In one embodiment, the transceiver unit is further configured to perform, based on the first protocol layer set, encapsulation processing on the RAT type indication information that is used to indicate the second RAT.

In one embodiment, the transceiver unit is further configured to send, based on the first RAT to a terminal device, the fourth indication information used to indicate the second protocol layer set.

In one embodiment, an apparatus for wireless communication is provided, and the apparatus includes: a transceiver unit, configured to negotiate with a first network device, so that the first network device determines target data and sends the target data to a terminal device, wherein the apparatus supports wireless communication based on a second radio access technology RAT, the first network device supports wireless communication based on a first radio access technology RAT, and the target data includes at least one of a plurality of types of data as follows: radio resource indication information, system information of the apparatus, radio resource control RRC layer data generated by the apparatus, radio link control RLC layer data generated by the apparatus, or media access control MAC layer data generated by the apparatus, wherein the radio resource indication information is used to indicate a target radio resource in radio resources allocated or granted by the apparatus, and the target radio resource is used to perform wireless communication based on the second RAT between the terminal device and the apparatus.

In one embodiment, when the target data includes the radio resource indication information, the transceiver unit is specifically configured to send, to the first network device, first indication information used to indicate the radio resources allocated or granted by the apparatus.

In one embodiment, the transceiver unit is specifically configured to receive second indication information sent by the first network device and used to indicate a data volume of uplink data that the terminal device needs to send to the apparatus; the apparatus further includes: a determining unit, configured to determine the target radio resource based on the second indication information; and the transceiver unit is specifically configured to send, to the first network device, third indication information used to indicate the target radio resource.

In one embodiment, when the target data includes the radio resource indication information, the transceiver unit is further configured to receive, based on the second RAT and by using the target radio resource, the uplink data sent by the terminal device.

In one embodiment, a second protocol stack used to perform wireless communication based on the second RAT is provided in the apparatus and the terminal device; the apparatus further includes a generation unit, configured to determine a second protocol layer set, wherein the second protocol layer set includes at least one protocol layer in the second protocol stack, and perform encapsulation processing based on the second protocol layer set to generate the target data; and the transceiver unit is specifically configured to send, to the first network device, the target data and fourth indication information used to indicate the second protocol layer set.

In one embodiment, an apparatus for wireless communication is provided, and configured in a communications system including at least two network devices, wherein the first network device supports wireless communication based on a first radio access technology RAT, the second network device supports wireless communication based on a second RAT, and the apparatus includes: a receiving unit, configured to receive, based on the first RAT, target data and RAT type indication information that are sent by the first network device, wherein the RAT type indication information is used to indicate the second RAT; wherein the target data is determined after the first network device negotiates with the second network device, and the target data includes at least one of a plurality of types of data as follows: radio resource indication information, system information of the second network device, radio resource control RRC layer data generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the apparatus and the second network device.

In one embodiment, when the target data includes the radio resource indication information, the apparatus further includes: a determining unit, configured to determine the second RAT based on the RAT type indication information; and a sending unit, configured to send, based on the second RAT and by using the target radio resource, uplink data to the second network device.

In one embodiment, the apparatus further includes: a determining unit, configured to determine, based on the RAT type indication information, a second protocol stack corresponding to the second RAT, and determine a second protocol layer set from the second protocol stack, wherein the second protocol layer set includes at least one protocol layer in the second protocol stack; and a processing unit, configured to perform decapsulation processing on the target data based on a first protocol layer set and the second protocol layer set, wherein the first protocol layer set includes at least one protocol layer in a first protocol stack corresponding to the first RAT.

In one embodiment, the determining unit is specifically configured to determine the second protocol layer set from the second protocol stack based on the protocol layer that is in the first protocol stack and is used when the RAT type indication information is obtained.

In one embodiment, the receiving unit is further configured to receive, based on the first RAT, fourth indication information sent by the first network device and used to indicate the second protocol layer set; and the determining unit is specifically configured to determine the second protocol layer set from the second protocol stack based on the fourth indication information.

In one embodiment, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

Based on the method and apparatus for wireless communication in the embodiments of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. Therefore, performance of wireless communication can be enhanced, and user experience on the terminal device can be improved.

BRIEF DESCRIPTION OF DRAWINGS

FIG. 1 is a schematic architecture diagram of an example of a communications system to which a method for wireless communication according to an embodiment of the present invention is applicable;

FIG. 2 is a schematic flowchart of a method for wireless communication according to an embodiment of the present invention;

FIG. 4 is a schematic flowchart of a method for wireless communication according to another embodiment of the present invention;

FIG. 5 is a schematic flowchart of a method for wireless communication according to another embodiment of the present invention;

DESCRIPTION OF EMBODIMENTS

Figure 3:
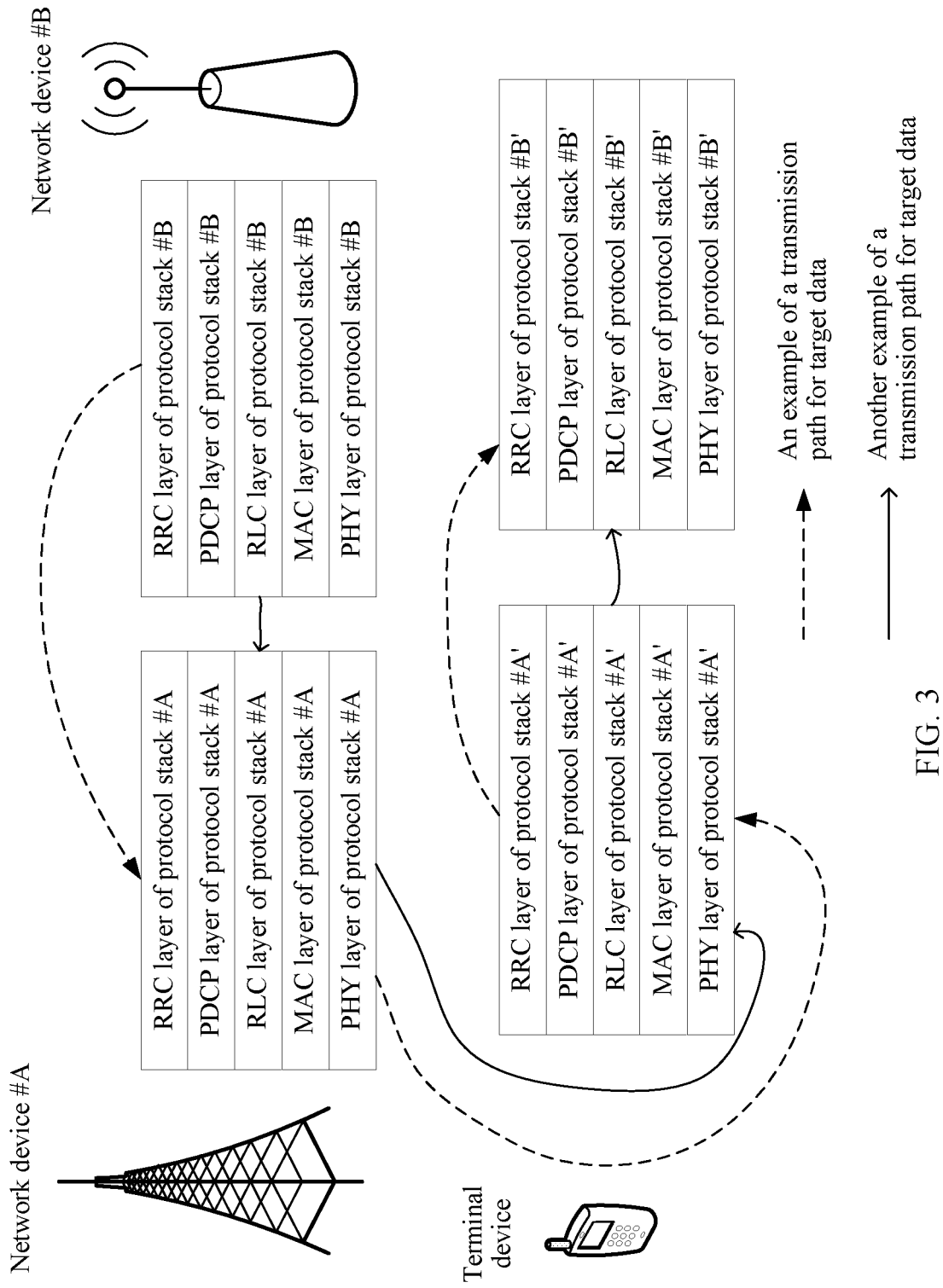
FIG. 3 is a schematic diagram of an information transmission process according to an embodiment of the present invention.

The following clearly describes the technical solutions in the embodiments of the present invention with reference to the accompanying drawings in the embodiments of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. A "component" may perform communication, for example, based on a signal having one or more data packets and by using a local or remote process. In addition, the data packet may be, for example, data from a component that interact with another component in a local system, a distributed system, or a network.

The solutions in the embodiments of the present invention may be applied to an existing cellular communications system, for example, a Global System for Mobile Communication (GSM), a Wideband Code Division Multiple Access (WCDMA) system, or a Long Term Evolution (LTE) system, and supported communication is mainly voice and data communication. Generally, a quantity of connections supported by a conventional base station is limited and is also easy to implement.

A next-generation mobile communications system will not only support conventional communication, but also support machine to machine (M2M) communication, also referred to as machine type communication (MTC). Based on a forecast, in 2020, a quantity of MTC devices connected to networks will reach 50 to 100 billion, far greater than an existing quantity of connections. Because M2M services are diversified, network requirements of the M2M services differ greatly. Generally, the following requirements exist:
reliable transmission, delay-insensitive; and
low delay and highly reliable transmission.

A service that requires reliable transmission but is delay-insensitive is relatively easy to process. However, a service that requires a low delay and highly reliable transmission, for example, a device to device (D2D) service, not only requires a short transmission delay, but also requires reliability. If transmission is not reliable, retransmission and an excessively long transmission delay are caused, and the requirement cannot be satisfied.

Because a large quantity of connections exist, a great difference exists between a future wireless communications system and an existing communications system. A large quantity of connections need to consume more resources for access of terminal devices and need to consume more resources for transmission of scheduling signaling related to data transmission of the terminal devices. The solutions based on the embodiments of the present invention can effectively resolve the foregoing resource consumption problem.

Optionally, a network device is a base station, and a terminal device is a user equipment.

Each embodiment of the present invention is described with reference to a terminal device. The terminal device may also be referred to as a user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless telephone set, a Session Initiation Protocol (SIP) phone, a wireless local loop (WLL) station, a personal digital assistant (PDA), a handheld device or a computing device having a wireless communication function, or another processing device connected to a wireless modem, an in-vehicle device, a wearable device, a terminal device in a future 5G network, a terminal device in a future evolved public land mobile network (PLMN), or the like.

In addition, each embodiment of the present invention is described with reference to a network device. The network device may be a device used for communicating with a mobile device. The network device may be an access point (AP) in a WLAN or a base transceiver station (BTS) in GSM or Code Division Multiple Access CDMA (CDMA t), or may be a NodeB (NB) in WCDMA, or may be an evolved NodeB (eNB or eNodeB) in LTE, a relay station or an access point, an in-vehicle device, a wearable device, a terminal device in a future 5G network, a network device in a future evolved PLMN network, or the like.

In addition, each aspect or feature of the embodiments of the present invention may be implemented as a method, an apparatus or a product using standard programming and/or engineering technologies. The terminology "product" used in this application covers a computer program that can be accessed in any computer readable device, carrier or medium. For example, the computer readable medium may include but is not limited to: a magnetic storage device (for example, a hard disk, a floppy disk, or a magnetic tape); an optical disc, for example, a compact disk (CD), a digital versatile disc (DVD), or the like; a smart card and a flash memory device, for example, an erasable programmable read-only memory (EPROM), a card, a stick, a key drive, or the like. In addition, various storage media described in this specification may represent one or more devices and/or other machine readable media used to store information. The terminology "machine readable medium" may include but is not limited to a radio channel, and any other medium that can store, contain, and/or carry an instruction and/or data.

FIG. 1 is a schematic diagram of a communications system 100 to which a method for wireless communication according to an embodiment of the present invention is applicable. As shown in FIG. 1, the communications system 100 includes a network device 102 (namely, an example of a first network device), a network device 104 (namely, an example of a second network device), and a terminal device 106.

The network device (for example, the network device 102 or the terminal device 106) may include a plurality of antennas. In addition, the network device may additionally include a transmitter and a receiver. A person of ordinary skill in the art may understand that both the transmitter and the receiver may include a plurality of components (for example, processors, modulators, multiplexers, demodulators, demultiplexers, or antennas) related to signal transmission and reception.

The network device may communicate with one or more terminal devices (for example, the terminal device 106). However, it may be understood that, the network device can communicate with any quantity of terminal devices similar to the terminal device. The terminal device may be, for example, a cellular phone, a smartphone, a portable computer, a handheld communications device, a handheld computing device, a satellite radio apparatus, a global positioning system, a PDA, and/or any other appropriate device used for communication in the wireless communications system 100.

In addition, the network device sends information to the terminal device by using a forward link, and receives information from the terminal device by using a reverse link.

For example, in a frequency division duplex (FDD) system, for example, a forward link may use a frequency band different from that used by a reverse link.

For another example, in a time division duplex (TDD) system and a full duplex (Full Duplex) system, a forward link and a reverse link may use a same frequency band.

Each antenna (or an antenna group including a plurality of antennas) and/or an area designed for communication is referred to as a sector of the network device. For example, the antenna group may be designed to communicate with a terminal device in a sector of an area covered by the network device. In a process in which the network device communicates with the terminal device by using a forward link 1, a transmit antenna of the network device may use beamforming to improve a signal-to-noise ratio of the forward link. In addition, in contrast to a manner in which a network device uses a single antenna to transmit signals to all terminal devices served by the network device, when the network device uses beamforming to transmit signals to terminal devices that are distributed randomly in a related coverage area, mobile devices in a neighboring cell receive relatively less interference.

At a given time, the network device or the terminal device may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a quantity of data bits that need to be sent to the wireless communications receiving apparatus through a channel. Such data bits may be included in a transport block (or a plurality of transport blocks) of data, and the transport block may be segmented to generate a plurality of code blocks.

In this embodiment of the present invention, the first network device (for example, the network device 102) and the second network (for example, the network device 104) use different radio access technologies to communicate with the terminal device.

A radio access technology (RAT), also referred to as an air interface technology, is critical for implementing wireless communication. The radio access technology is to connect a terminal device to a network device by using a wireless medium, so as to implement information transfer between a user and a network. A signal transmitted on a radio channel should comply with some protocols, and the protocols constitute main content of the radio access technology. A main difference between the radio access technology and a wired access technology lies in that a mobile access service can be provided to the user. A radio access network is an access technology that partially or completely uses a radio wave transmission medium to connect the user to a switching center. In a communications network, a radio access network is positioned as a part of a local communications network, and is an extended, supplementary, and temporary emergency system of the local wired communications network.

The radio access technology determines features of wireless communication, for example, a delay, a transmission rate, or coverage.

In this embodiment of the present invention, different RATs may be RATs in which at least one of the following parameters or information is different:

a waveform parameter, a modulation mode, a multiple access mode, a bandwidth configuration, a radio frame configuration mode, a resource reuse mode, a user scheduling mode, a channel configuration mode, a coding mode, or a protocol stack configuration mode.

The following separately describes specific functions and definitions of the foregoing parameters in detail.

A. Waveform Parameter

The waveform parameter, or a parameter of a waveform, is a parameter that can indicate or determine the waveform.

As an example instead of a limitation, in this embodiment of the present invention, the waveform parameter may include at least one of the following parameters:

A1. A waveform parameter used in an orthogonal frequency division multiplexing (OFDM, Orthogonal Frequency Division Multiplexing) technology;

A2. A waveform parameter used in single carrier frequency division multiple access (SC-OFDM, Single-carrier Frequency-Division Multiple Access);

A3. A waveform parameter used in a filter orthogonal frequency division multiplexing (filter OFDM) technology;

A4. A waveform parameter used in a universal filtered multi-carrier (UFMC) technology;

A5. A waveform parameter used in a filter bank multi-carrier (FBMC) technology; and A6. A waveform parameter used in a generalized frequency division multiplexing (GFDM) technology.

B. Modulation Mode

In a communications technology, to ensure a communication effect and overcome a problem in remote signal transmission, a signal spectrum is shifted through modulation to a high-frequency channel for transmission. The process of loading a to-be-transmitted signal to a high-frequency channel is referred to as modulation. As an example instead of a limitation, in this embodiment of the present invention, the modulation mode may include at least one of the following modes:

B1. An amplitude shift keying (ASK) modulation;
B2. A phase shift keying (PSK) modulation;
B3. A frequency shift keying (FSK) modulation;
B4. A quadrature amplitude modulation (QAM);
B5. A minimum shift keying (MSK) modulation;
B6. A Gaussian filtered minimum shift keying (GMSK) modulation; and
B7. An OFDM modulation.

C. Bandwidth Configuration

In this embodiment of the present invention, the bandwidth configuration may indicate a used width of a frequency domain resource required by an air interface. As an example instead of a limitation, a bandwidth configuration corresponding to a broadband transmission service may indicate a minimum frequency domain resource width required by an air interface, or a quantity of subcarriers; and a bandwidth configuration corresponding to a narrowband transmission service may indicate a maximum frequency domain resource width required by an air interface, or a quantity of subcarriers.

D. Radio Frame Configuration Mode

In one embodiment, a radio frame configuration mode may include at least one of the following D1. A subcarrier spacing;
D2. A symbol length;
D3. A cyclic prefix (CP);
D4. A duplex mode, for example, full duplex, half duplex (including an uplink-downlink configuration of half duplex), or flexible duplex, where it should be noted that, on some air interfaces, the full duplex mode may be fixed or changed flexibly, and this is not particularly limited in embodiments of the present invention;
D5. A transmission time interval (TTI) length, where it should be noted that, on some air interfaces, the transmission time interval may be a fixed value or may be changed flexibly, and this is not particularly limited in embodiments of the present invention; and
D6. A radio frame and length of a radio subframe.

E. Resource Reuse Mode

As an example instead of a limitation, in this embodiment of the present invention, the resource reuse mode may include at least one of the following modes:

E1. A frequency division multiplexing (FDM), that is, a total bandwidth used for transmitting a channel is divided into several subbands (or referred to as subchannels), and each subchannel transmits one signal. Frequency division multiplexing requires that a total bandwidth should be greater than a sum of bandwidths of all subchannels. In addition, to ensure that there is no interference between signals transmitted on the subchannels, a guard band needs to be provided between the subchannels. This ensures that the signals do not interfere with each other (one condition).

E2. A time division multiplexing (TDM), that is, different time segments of a same physical connection are used to transmit different signals, and this can also achieve an objective of multipath transmission. Time division multiplexing uses time as a parameter for signal segmentation, and therefore, the signals do not overlap each other on a time axis. Time division multiplexing is used to divide time provided to a whole channel for information transmission into several time slices (timeslots), and allocate the timeslots to each signal source for use.

E3. A space division multiplexing (SDM), that is, a same frequency band is repeatedly used in different spaces. In mobile communication, a basic technology that can implement space division is to use an adaptive array antenna and form different beams in different user directions. In addition, space division may be used to distinguish different users, or each beam may provide a unique channel that receives no interference from other users; or space division may be used to distinguish different data of a same user; or space division may be used to distinguish same data of a same user to obtain a higher gain.

E4. A code division multiplexing (CDM), that is, a multiplexing mode for distinguishing original signals by using different codes. As an example instead of a limitation, for example, a code division multiple access (CDMA), a frequency division multiple access (FDMA), a time division multiple access (TDMA), and a synchronous code division multiple access (SCDMA) may be illustrated.

G. Channel Configuration Mode

In this embodiment of the present invention, different channels may be used to transmit different types of data or signals. Therefore, the channel configuration mode may indicate time-frequency resources, code domain resources, and space domain resources (such as provided beams) corresponding to channels.

As an example instead of a limitation, in this embodiment of the present invention, channels used for wireless communication may include at least one of the following channels or a combination of the channels:

G1. A control channel, used to transmit control information, for example, including an uplink control channel and a downlink control channel;

G2. A data channel, used to transmit data, for example, including an uplink data channel and a downlink data channel;

G3. A reference channel, used to transmit a reference signal; and

G4. An access channel, used to send access information.

H. Coding Mode

Coding is a source symbol transform performed for a purpose of improving communication effectiveness, or is a source symbol transform performed for a purpose of reducing or eliminating source redundancy. Specifically, in view of a statistical feature of a source output symbol sequence, a method is sought to transform the source output symbol sequence to a shortest codeword sequence, so as to maximize an average amount of information carried in each element of the shortest codeword sequence while ensuring that the original symbol sequence can be recovered without distortion.

As an example instead of a limitation, in this embodiment of the present invention, the following coding modes may be illustrated:

H1. A polar code (Polar Code);
H2. A turbo code (Turbo Code); and
H3. A convolutional code (Convolution Code).

I. Protocol Stack Configuration Mode

A protocol stack (Protocol Stack) is a sum of protocols in all layers in the network. The protocol stack visually reflects a file transmission process in the network: from an upper-layer protocol to a bottom-layer protocol, and then from a bottom-layer protocol to an upper-layer protocol. As an example instead of a limitation, in this embodiment of the present invention, a protocol stack used in wireless communication may include at least one of the following protocol layers or a combination of the protocol layers, and a plurality of protocol entities may exist in each protocol layer:

I1. A Packet Data Convergence Protocol (PDCP) layer;
I2. A radio link control (RLC) layer;
I3. A media access control (MAC) layer;
I4. A physical (Physical) layer; and
I5. A radio resource control (RRC) layer.

J. Multiple Access Mode

Different from multiplexing, a multiple access technology does not require centralization of each signal; instead, each signal is separately modulated and then sent on a channel, and each signal is separately fetched from the channel and then required information is obtained through demodulation. As an example instead of a limitation, in this embodiment of the present invention, the multiple access mode used in wireless communication may include at least one of the following modes:

J1. A FDMA;
J2. A TDMA;
J3. A CDMA;
J4. A SCMA;
J5. A non orthogonal multiple access (NOMA); and
J6. A multi-user shared access (MUSA).

It should be understood that, specific content included in the foregoing illustrated configuration information is merely an example, and embodiments of the present invention are not limited thereto. In the prior art, all other parameters and information that can be determined in a mode provided in advance in a network device and a terminal device shall fall within the protection scope of configuration information in this embodiment of the present invention.

In this embodiment of the present invention, the terminal device can support a plurality of (two or more) types of RATs, or can be applicable to a plurality of air interfaces for wireless communication. At least one parameter or at least one piece of information in the foregoing illustrated configuration information varies between the plurality of air interfaces.

In addition, in this embodiment of the present invention, a quantity and types of RATs that the terminal device can support may be the same as or partially different from a quantity and types of RATs of the network devices (including the first network device and the second network device), and this is not particularly limited in embodiments of the present invention. "Partially different" means that the RATs supported by the terminal device and the RATs of the network devices have an intersection, that is, the network devices and the terminal device all support air interfaces in the intersection, and the intersection includes at least two air interfaces.

Therefore, it can be ensured that the terminal device can communicate with the first network device and the second network device.

It should be noted that, the communications system 100 may be a PLMN network or a D2D network or an M2M network or another network. FIG. 1 is merely a simplified schematic diagram of an example, and the network may further include other network devices not shown in FIG. 1. In addition, quantities of network devices and terminal devices in the example shown in FIG. 1 are merely illustrative, and the embodiments of the present invention are not limited thereto.

Optionally, a first RAT is an RAT provided in a Long Term Evolution LTE network, and a second RAT is an RAT provided in a next-generation communications network.

As an example instead of a limitation, in this embodiment of the present invention, the first RAT may be an RAT provided in a 4G network (for example, the LTE network or an LTE-A network), that is, the first network device may be a network device in the 4G network, for example, an eNB. The second RAT may be an RAT provided in the next-generation communications network (for example, a 5G network), that is, the second network device may be a network device in the 5G network.

Specifically, in the current 4G network, the network device generally has relatively wide coverage. In contrast to the 4G network, the 5G network is expected to implement data transmission with a shorter delay and a higher rate. A deployment scenario of the 5G network is shown in FIG. 1, that is, a network device (namely, the second network device) in the 5G network may be deployed within coverage of a macro base station, a network device (namely, the first network device) in the 4G network. Therefore, the network device in the 4G network can be used as a macro base station, and the network device in the 5G network can be used as a micro base station, so as to further increase a network capacity. In addition, when the terminal device performs uplink data transmission or downlink data transmission by using the 5G network (namely, the second network device), a data transmission rate of the terminal device can be increased, and a service access delay of the terminal device can be reduced.

For ease of understanding, an example in which the first network device is a network device in the 4G network and the second network device is a network device in the 5G network is used for description hereinafter.

FIG. 2 is a schematic flowchart of a method 200 for wireless communication according to an embodiment of the present invention. The method is described from a perspective of a first network device. As shown in FIG. 2, the method 200 includes the following operations.

An operation S210. At operation S210, a first network device negotiates with a second network device to determine target data, wherein the first network device supports wireless communication based on a first radio access technology RAT, and the second network device supports wireless communication based on a second RAT.

An operation S220. At operation S220, the first network device sends, based on the first RAT to a terminal device, the target data and RAT type indication information that is used to indicate the second RAT.

The target data includes at least one of a plurality of types of data as follows:

radio resource indication information, system information of the second network device, radio resource control RRC layer data generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

In this embodiment of the present invention, a communications system may include a plurality of network devices.

The first network device (denoted as a network device # A for ease of understanding and distinguishing hereinafter) uses the first RAT (for example, an RAT provided in a 4G network). In addition, the first network device may be a network device currently accessed by the terminal device.

In addition, a plurality of candidate network devices may be configured in the communications system. The second network device (denoted as a network device # B for ease of understanding and distinguishing hereinafter) uses the second RAT (for example, an RAT provided in a 5G network).

In addition, in this embodiment of the present invention, the network device # A may determine, based on a report from the network device # B or an instruction of a higher-layer management device, an RAT used by the network device # B, namely, the second RAT.

It should be noted that, in this embodiment of the present invention, RATs used by the foregoing plurality of candidate network devices may be the same, or may be different or partially different (that is, RATs used by some network devices are the same and RATs used by some network devices are different). This is not limited in embodiments of the present invention.

In this embodiment of the present invention, the network device # A may negotiate with the network device # B to determine data that the network device # B needs to send to the terminal device, for example, the system information of the second network device, the RRC layer data generated by the second network device, the radio link control RLC layer data generated by the second network device, and the media access control MAC layer data generated by the second network device.

It should be noted that, the RRC layer data may include data (for example, an RRC message) that is encapsulated by an RRC layer of a protocol stack provided in the network device # B, or may include data (for example, content of an RRC message) that is not encapsulated by an RRC layer in the network device # B. In addition, the data that is not encapsulated by the RRC layer in the network device # B may include data that is generated by the RRC layer but is not encapsulated by the RRC layer, or may include data that is delivered to the RRC layer by a higher protocol layer in the protocol stack provided in the network device # B but is not encapsulated by the RRC layer.

The RLC layer data may include data (for example, an RLC layer PDU) that is encapsulated by an RLC layer of the protocol stack provided in the network device # B, or may include data (for example, content of an RLC layer PDU) that is not encapsulated by an RLC layer in the network device # B. In addition, the data that is not encapsulated by the RLC layer in the network device # B may include data that is generated by the RLC layer but is not encapsulated by the RLC layer, or may include data that is delivered to the RLC layer by a higher protocol layer (for example, an RRC layer or a PDCP layer) in the protocol stack provided in the network device # B but is not encapsulated by the RLC layer.

The MAC layer data may include data (for example, a MAC layer PDU) that is encapsulated by a MAC layer of the protocol stack provided in the network device # B, or may include data (for example, content of a MAC layer PDU) that is not encapsulated by a MAC layer in the network device # B. In addition, the data that is not encapsulated by the MAC layer in the network device # B may include data that is generated by the MAC layer but is not encapsulated by the MAC layer, or may include data that is delivered to the MAC layer by a higher protocol layer (for example, the RLC layer) in the protocol stack provided in the network device # B but is not encapsulated by the MAC layer.

Alternatively, the network device # A may negotiate with the network device # B to determine resource information (namely, an example of target data) used for performing uplink transmission by the terminal device with the network device # B, for example, radio resource indication information.

The following first describes a specific procedure of the method 200 when the target data includes the radio resource indication information.

A protocol stack (for example, a protocol stack complying with a 4G network transmission specification) corresponding to the first RAT provided in the network device # A is hereinafter denoted as a protocol stack # A for ease of understanding and description. A protocol stack (for example, a protocol stack corresponding to the protocol stack # A and complying with the 4G network transmission specification) corresponding to the first RAT provided in the terminal device is denoted as a protocol stack # A'. A protocol stack (for example, a protocol stack complying with a 5G network transmission specification) corresponding to the second RAT provided in the network device # B is denoted as a protocol stack # B. A protocol stack (for example, a protocol stack corresponding to the protocol stack # B and complying with the 5G network transmission specification) corresponding to the second RAT provided in the terminal device is denoted as a protocol stack # B'.

The network device # A may deliver, to the terminal device, indication information (namely, the radio resource indication information) used to indicate the target radio resource in the radio resources allocated or granted by the second network device.

In this embodiment of the present invention, the target radio resource may be determined by the network device # A from the radio resources allocated or granted by the second network device (namely, a mode 1), or the target radio resource may be determined by the network device # B (namely, a mode 2). The following describes specific processing procedures in the two modes in detail.

Mode 1

Optionally, when the target data includes the radio resource indication information, the negotiation processing performed between the first network device and the second network device includes:

the first network device receives first indication information sent by the second network device and used to indicate the radio resources allocated or granted by the second network device;

the first network device determines, based on the first indication information, the target radio resource from the radio resources allocated or granted by the second network device; and the first network device generates the radio resource indication information based on the target radio resource.

Specifically, in this embodiment of the present invention, a communications connection, for example, a communications connection that is implemented by using an optical fiber, a copper wire, a radio link, or the like, may be provided between the first network device and the foregoing candidate network device (for example, between the network device # A and the network device # B).

Therefore, the network device # B may send, to the network device # A, the first indication information used to indicate the radio resources allocated or granted by the network device # B.

It should be noted that, in this embodiment of the present invention, the radio resources allocated or granted by the network device # B may be idle resources that are not occupied in radio resources that are allocated by the system to the network device # B, that is, the target radio resource determined from the radio resources allocated or granted by the network device # B may also be an idle resource that is not occupied.

Alternatively, the radio resources allocated or granted by the network device # B may be resources, used by a plurality of terminal devices in a multiplexing (for example, time division multiplexing, code division multiplexing, or space division multiplexing) mode, in the radio resources that are allocated by the system to the network device # B, that is, the target radio resource determined from the radio resources allocated or granted by the network device # B may also be a resource reused by a plurality of terminal devices in the system.

It should be understood that, the foregoing illustrated method used by the network device # A to determine the radio resources allocated or granted by the network device # B is merely an example, and embodiments of the present invention are not limited thereto. For example, a network administrator may prestore, in the network device # A, indication information used to indicate the radio resources allocated or granted by the network device # B, or the network device # A may obtain in advance, from a management device (or a higher-layer device) of the network device # B, indication information used to indicate the radio resources allocated or granted by the network device # B.

Therefore, the network device # A may determine the target radio resource from the radio resources allocated or granted by the network device # B.

For example, the network device # A may learn in advance a data volume of uplink data that the terminal device needs to send and a transmission requirement of the uplink data (or a service requirement of a service to which the uplink data belongs, for example, a transmission interval or a delay), and determine the target radio resource based on the data volume of the uplink data, so that the target radio resource can satisfy the transmission requirement of the uplink data.

Then the network device # A may perform encapsulation processing on the indication information of the target radio resource by using the protocol stack (for example, the foregoing protocol stack # A) corresponding to the first RAT, so as to generate first indication information satisfying a transmission requirement of the first RAT, and send the first indication information to the terminal device.

Therefore, the terminal device may perform decapsulation processing on the first indication information based on the protocol stack (for example, the foregoing protocol stack # N) corresponding to the first RAT, so as to obtain the indication information of the target radio resource, and further determine the target radio resource.

Mode 2

Optionally, when the target data includes the radio resource indication information, the negotiation processing performed between the first network device and the second network device includes:

the first network device sends, to the second network device, second indication information used to indicate a data volume of uplink data that the terminal device needs to send to the second network device;

the first network device receives third indication information sent by the second network device based on the second indication information and used to indicate the target radio resource; and the first network device generates the radio resource indication information based on the third indication information.

Specifically, in this embodiment of the present invention, a communications connection, for example, a communications connection that is implemented by using an optical fiber, a copper wire, a radio link, or the like, may be provided between the first network device and the foregoing candidate network device (for example, between the network device # A and the network device # B).

The network device # A may learn in advance the data volume of the uplink data that the terminal device needs to send, and send, to the network device # B, information (namely, an example of the second indication information) indicating the data volume of the uplink data.

Therefore, the network device # B may determine, based on the data volume of the uplink data, the target radio resource from the radio resources allocated by the system to the network device # B, so that the target radio resource can satisfy a transmission requirement of the uplink data.

It should be understood that, the foregoing illustrated method used by the network device # B to determine the target radio resource is merely an example, and embodiments of the present invention are not limited thereto. For example, the network device # A may further notify the network device # B of a service requirement of a service to which the uplink data belongs, for example, a transmission interval or a delay. In addition, the network device # B may determine the target radio resource based on the data volume of the uplink data and the service requirement, so that the target radio resource can satisfy the service requirement of the service to which the uplink data belongs.

It should be noted that, in this embodiment of the present invention, the target radio resource determined by the network device # B may be an idle resource that is not occupied in radio resources that are allocated by the system to the network device # B.

Alternatively, the target radio resource determined by the network device # B may be a resource, used by a plurality of terminal devices in a multiplexing (for example, time division multiplexing, code division multiplexing, or space division multiplexing) mode, in the radio resources that are allocated by the system to the network device # B.

Then the network device # B may send, to the network device # A, the third indication information used to indicate the target radio resource.

Then the network device # A may perform encapsulation processing on the indication information (namely, the third indication information) of the target radio resource by using all or some protocol layers of the protocol stack # A, so as to generate third indication information satisfying a transmission requirement of the first RAT, and send the third indication information to the terminal device.

It should be noted that, in this embodiment of the present invention, the third indication information may also be information on which no encapsulation processing is performed by using the protocol stack # B provided in the network device # B; therefore, the terminal device needs to perform decapsulation processing on the first indication information only by using the protocol stack # A', and can obtain the third indication information and further determine the target radio resource.

Alternatively, the third indication information may be information on which the network device # B performs encapsulation processing by using all or some protocol layers of the protocol stack # B. That is, the terminal device needs to perform decapsulation processing on the first indication information by using all or some protocol layers of the protocol stack # A', so as to obtain the third indication information, and perform decapsulation processing on the third indication information by using all or some protocol layers of the protocol stack # B' to obtain content of the third indication information, and further determine the target radio resource. The following describes the process in detail.

In this embodiment of the present invention, in addition to the first RAT and the second RAT, the terminal device may further support other RATs. In this case, the network device # A further needs to notify the terminal device of an RAT type used by the network device # B, that is, the network device # A may further send, to the terminal device, indication information of the RAT type of the second RAT by using the first RAT. Therefore, the terminal device may enable, based on the indication information of the RAT type of the second RAT, the protocol stack # B' corresponding to the second RAT, to encapsulate the uplink data that needs to be sent to the network device # B, or parse the indication information of the target radio resource that is encapsulated by the network device # B by using the protocol stack # B.

For example, the network device # A may perform encapsulation processing on the indication information of the RAT type of the second RAT by using the protocol stack # A, to generate RAT type indication information satisfying the transmission requirement of the first RAT, and send the RAT type indication information to the terminal device.

Therefore, the terminal device may perform decapsulation processing on the RAT type indication information based on the protocol stack # A' to obtain the RAT type indication information of the second RAT, and further determine the RAT type (namely, the second RAT) used when uplink data is sent.

As described above, the terminal device can determine the target radio resource used when the uplink data is transmitted by using the second RAT.

Therefore, the terminal device may perform encapsulation processing on the uplink data by using the protocol stack # B', to generate data complying with a specification of the second RAT, and send the uplink data by using the target radio resource.

The network device # B may monitor the radio resources (including the target radio resource) granted or allocated by the network device # B, and may receive, based on the second RAT, the uplink data from the terminal device by using the target radio resource.

In addition, the method and process of receiving data by the network device # B based on the second RAT may be similar to those in the prior art. Herein to avoid repetition, detailed descriptions thereof are omitted.

In addition, in this embodiment of the present invention, after receiving the uplink data from the terminal device, the network device # B may transmit the uplink data to the network device # A by using an ideal backhaul path such as an optical fiber, or may directly transmit the uplink data to a core network device or a service server of a service corresponding to the uplink data. This is not particularly limited in embodiments of the present invention.

The foregoing illustrates a specific process of the method 200 when the target data includes the radio resource indication information. However, embodiments of the present invention are not limited thereto. The target data may further include one or more of the following types of data:

1. System Information of the Second Network Device

Specifically, the system information may be system broadcast information delivered by the network device # B by broadcast to each terminal device in a cell served by the network device # B, and as an example instead of a limitation, may include:

1a. Random Access Information Used for Access Processing for the Second Network Device Specifically, in the prior art, a terminal device generally needs to access a network device before the terminal device can send uplink data to the network device. Therefore, for compatibility with the prior art, in this embodiment of the present invention, the network device # B may send the random access information used for access processing for the network device # B to the network device # A. Therefore, the network device # A may send the random access information to the terminal device by using the first RAT. Therefore, the terminal device may perform access processing for the network device # B based on the random access information. In addition, other information that is generated by the network device # B in the access processing and needs to be sent to the terminal device may also be delivered through the network device # A to the terminal device.

1b. Synchronization Information Used for Synchronization Processing for the Second Network Device Specifically, in the prior art, the terminal device generally needs to complete synchronization with the network device before the terminal device can send the uplink data to the network device, so as to improve reliability of transmission. Therefore, for compatibility with the prior art, in this embodiment of the present invention, the network device # B may send the synchronization information used for synchronization processing for the network device # B to the network device # A. Therefore, the network device # A may send the synchronization information to the terminal device by using the first RAT. Therefore, the terminal device may perform synchronization processing for the network device # B based on the synchronization information. In addition, other information that is generated by the network device # B in the synchronization information and needs to be sent to the terminal device may also be delivered through the network device # A to the terminal device.

It should be understood that, the foregoing illustrated specific types or content of the system information is merely an example, and embodiments of the present invention are not limited thereto. All other information that the network device delivers by broadcast in the prior art shall fall within the protection scope of the embodiments of the present invention.

2. RRC Layer Data Generated by the Second Network Device

Specifically, the RRC layer data may include an RRC message (or an RRC layer message) generated after the second network device performs encapsulation processing by using the RRC layer of the protocol stack # B.

Alternatively, the RRC layer data may include information or data (for example, content in the foregoing RRC message) on which no encapsulation processing is performed by the second network device by using the RRC layer of the protocol stack # B, for example, information or data generated by the RRC layer itself, or information or data delivered by a higher layer to the RRC layer.

In this embodiment of the present invention, a function and a generation process of the RRC message may be similar to those in the prior art. Herein to avoid repetition, detailed descriptions thereof are omitted.

3. Radio Link Control RLC Layer Data Generated by the Second Network Device

Specifically, the RLC layer data may include an RLC layer protocol data unit (PDU, Protocol Data Unit) generated after the second network device performs encapsulation processing by using the RLC layer of the protocol stack # B.

Alternatively, the RLC layer data may include information or data (for example, content of the foregoing RLC layer PDU) on which no encapsulation processing is performed by the second network device by using the RLC layer of the protocol stack # B, for example, information or data generated by the RLC layer itself, or information or data delivered by a higher layer such as the PDCP layer or the RRC layer to the RLC layer.

In this embodiment of the present invention, a function and a generation process of the RLC layer PDU may be similar to those in the prior art. Herein to avoid repetition, detailed descriptions thereof are omitted.

4. Media Access Control MAC Layer Data Generated by the Second Network Device

Specifically, the MAC layer data may include a MAC layer PDU generated after the second network device performs encapsulation processing by using the MAC layer of the protocol stack # B.

Alternatively, the MAC layer data may include information or data (for example, content of the foregoing MAC layer PDU) on which no encapsulation processing is performed by the second network device by using the MAC layer of the protocol stack # B, for example, information or data generated by the MAC layer itself, or information or data delivered by a higher layer such as the RLC layer to the MAC layer.

In this embodiment of the present invention, a function and a generation process of the MAC layer PDU may be similar to those in the prior art. Herein to avoid repetition, detailed descriptions thereof are omitted.

It should be understood that, specific information of the foregoing illustrated plurality of types of data is merely an example, and is not particularly limited in embodiments of the present invention. For example, the data may further include downlink feedback information that is sent by the second network device for the uplink data that is sent by the terminal device to the second network device.

That is, optionally, the method further includes:

the first network device receives, by using the communications connection, the downlink feedback information that is sent by the second network device for the uplink data that is sent by the terminal device to the second network device; and the first network device sends, based on the first RAT, the downlink feedback information to the terminal device, so that the terminal device performs retransmission processing for the uplink data based on the downlink feedback information.

Specifically, in the prior art, to ensure reliability of data transmission, a retransmission mechanism is provided, for example, a hybrid automatic repeat request (HARQ, Hybrid Automatic Repeat reQuest) technology. That is, in uplink transmission, the network device needs to feed back to the terminal device whether the uplink data sent by the terminal device is received correctly, for example, acknowledgement (ACK) information or negative acknowledgement (NACK) information, so as to improve reliability of transmission.

Therefore, for compatibility with the prior art, in this embodiment of the present invention, the network device # B may send the feedback information of the uplink data to the network device # A. Therefore, the network device # A may send the feedback information to the terminal device by using the first RAT. Therefore, the terminal device may perform retransmission processing for the uplink data based on the feedback information.

In this embodiment of the present invention, the target data may be data only processed by the network device # A by using the protocol stack # A, or the target data may be data that is not processed by the protocol stack # B provided in the network device # B. In this case, the terminal device needs to perform decapsulation processing on the received information only by using the protocol stack # A, so as to obtain specific content of the target data.

Alternatively, in this embodiment of the present invention, the target data may be data processed by the network device # B by using some or all protocol layers of the protocol stack # B; in addition, after receiving the data from the network device # B, the network device # A further performs encapsulation processing on the data by using some or all protocol layers of the protocol stack # A to generate data. In this case, the terminal device cannot obtain specific content of the target data merely by using the protocol stack # A', and needs to further perform further decapsulation, by using all or some protocol layers of the protocol stack # B' (which may be determined based on the RAT type indication information that is used to indicate the second RAT), on data that is decapsulated by using all or some protocol layers of the protocol stack # A', and then can obtain the specific content of the target data.

The following describes a specific process of the method 100 in detail when the target data is data that is processed by using some or all protocol layers of the protocol stack # B provided in the network device # B.

Optionally, a second protocol stack used to perform wireless communication based on the second RAT is provided in the second network device and the terminal device, the target data is generated by the second network device after the second network device performs encapsulation processing by using a second protocol layer set, the second protocol layer set includes at least one protocol layer in the second protocol stack, and a first protocol stack used to perform wireless communication based on the first RAT is provided in the first network device and the terminal device; and before the first network device sends, based on the first RAT to the terminal device, the target data and RAT type indication information that is used to indicate the second RAT, the method further includes:

the first network device receives fourth indication information sent by the second network device and used to indicate the second protocol layer set;

the first network device determines a first protocol layer set based on the fourth indication information, wherein the first protocol layer set includes at least one protocol layer in the first protocol stack; and the first network device performs encapsulation processing on the target data based on the first protocol layer set.

Specifically, the network device # B may perform encapsulation processing, by using all or some protocol layers of the protocol stack # B, on information content that needs to be transmitted to the terminal device, to generate target data satisfying a transmission requirement of the second RAT, and send the target data to the network device # A.

As an example instead of a limitation, for example, as shown in FIG. 3, the target data may be data generated after the network device # B processes, by using the RRC layer (namely, an example of the second protocol layer set) of the protocol stack # B, data or information generated by the RRC layer itself, or data or information from a higher layer, for example, an RRC message or content of the RRC message.

Alternatively, the target data may be data generated after the network device # B processes, by using the RRC layer and the RLC layer (namely, another example of the second protocol layer set) of the protocol stack # B, data or information generated by the RLC layer itself, or data or information from a higher layer (for example, the PDCP layer or the RRC layer), for example, an RLC layer PDU or content of the RLC layer PDU.

Alternatively, the target data may be data generated after the network device # B processes, by using the RRC layer, the RLC layer, and the MAC layer (namely, another example of the second protocol layer set) of the protocol stack # B, data or information generated by the MAC layer itself, or data or information from a higher layer (for example, the RLC layer), for example, a MAC layer PDU or content of the MAC layer PDU.

Alternatively, the target data may be data generated after the network device # B processes, by using the RRC layer, the RLC layer, the MAC layer, and a PHY layer (namely, another example of the second protocol layer set) of the protocol stack # B, data or information generated by the PHY layer itself, or data or information from a higher layer (for example, the MAC layer), for example, a PHY message or content of the PHY message.

The message or information in each layer may be a message or information corresponding to each layer after being processed (for example, encapsulated) by the corresponding protocol layer. However, the message or information content generated by each layer may be specific configuration information or scheduling information, and is content that is not processed (for example, encapsulated) by the corresponding protocol layer.

In addition, the protocol layers (for example, RRC, RLC, MAC, and PHY) in embodiments of the present invention are merely examples, and are not limited to the listed names or forms.

It should be understood that, the foregoing illustrated composition of the protocol layer set and the form of the target data are merely examples, and embodiments of the present invention are not limited thereto. A random change may be made based on a specific requirement of the second RAT.

In addition, the processing method and process of each protocol layer in the network device # B may be similar to those in the prior art. Herein to avoid repetition, detailed descriptions thereof are omitted.

Optionally, the target data may be downlink control information DCI.

Specifically, in this embodiment of the present invention, the target data may be downlink control information (DCI, Downlink Control Information) for resource scheduling, delivered by the network device # B and used by the terminal device to perform uplink transmission. Therefore, the prior art can be used to indicate information about the target radio resource in this embodiment of the present invention. This can further improve practical applicability and generality of this embodiment of the present invention.

It should be understood that, the foregoing illustrated specific implementation of the target data is merely an example, and embodiments of the present invention are not limited thereto. All other signaling or messages that can indicate the target radio resource shall fall within the protection scope of this embodiment of the present invention.

In this embodiment of the present invention, the network device # A may perform encapsulation processing on the target data by using all protocol layers (an example of the first protocol layer set) of the protocol stack # A, so that the target data after the encapsulation complies with the requirement of the first RAT.

Alternatively, the network device # A may learn specific protocol layers included in the second protocol layer set, determine some protocol layers in the protocol stack # A as the first protocol layer set based on the second protocol layer set, and perform encapsulation processing on the target data based on the first protocol layer set, so that the target data after the encapsulation satisfies the requirement of the first RAT.

For example, the network device # A may learn the specific protocol layers included in the second protocol layer set. The following modes may be illustrated:

That is, the network device # B may send, to the network device # A, indication information (namely, the fourth indication information) used to indicate the second protocol layer set. Therefore, the network device # A may determine the second protocol layer set based on the fourth indication information, that is, a protocol layer in the protocol stack # B for processing the target data. Therefore, based on the second protocol layer set and based on the protocol layers in the protocol stack # A, encapsulation processing may be performed on the fourth indication information to generate fourth indication information satisfying the transmission requirement of the first RAT, and the fourth indication information is sent to the terminal device.

Specifically, for example, as shown in FIG. 3, when the target data is RRC layer data generated after the network device # B performs processing by using the RRC layer (namely, an example of the second protocol layer set) of the protocol stack # B, the network device # B may use the target data as information from a higher layer (namely, a protocol layer above the RRC layer), and perform encapsulation processing on the target data by using the RRC layer, the PDCP layer, the RLC layer, the MAC layer, and the PHY layer (namely, an example of the first protocol layer set) of the protocol stack # A.

Alternatively, when the target data is RLC information generated after the network device # B performs processing by using the RRC layer and the RLC layer (namely, another example of the second protocol layer set) of the protocol stack # B, or the RLC layer (namely, another example of the second protocol layer set) of the protocol stack # B, the network device # B may use the target data as information from a higher layer (namely, a protocol layer above the RLC layer), and perform encapsulation processing on the target data by using the RLC layer, the MAC layer, and the PHY layer (namely, another example of the first protocol layer set) of the protocol stack # A.

Alternatively, when the target data is MAC information generated after the network device # B performs processing by using the RRC layer, the RLC layer, and the MAC layer (namely, another example of the second protocol layer set) of the protocol stack # B, or the MAC layer (namely, another example of the second protocol layer set) of the protocol stack # B, the network device # B may use the target data as information from a higher layer (namely, a protocol layer above the MAC layer), and perform encapsulation processing on the target data by using the MAC layer and the PHY layer (namely, another example of the first protocol layer set) of the protocol stack # A, so as to generate the first indication information.

Alternatively, when the target data is PHY information generated after the network device # B performs processing by using the RRC layer, the RLC layer, the MAC layer, and the PHY layer (namely, another example of the second protocol layer set) of the protocol stack # B, the network device # B may use the target data as information from a higher layer (namely, a protocol layer above the PHY layer), and perform encapsulation processing on the target data by using the PHY layer (namely, another example of the first protocol layer set) of the protocol stack # A.

It should be understood that, a specific protocol layer of the protocol stack # B that is used when the network device # B processes the target data is merely an example, and embodiments of the present invention are not limited thereto. An adaptive change may be made based on the specific protocol layer of the protocol stack # A that is used when the network device # A generates the target data.

In addition, the processing procedure and method of each protocol layer in the network device # A may be similar to those in the prior art. Herein to avoid repetition, detailed descriptions thereof are omitted.

It should be noted that, in this embodiment of the present invention, the network device # B may add the target data and the fourth indication information to a same message (or a packet, or a data packet) and send the message to the network device # A. Alternatively, the network device # B may add the target data and the fourth indication information to different messages (or packets, or data packets) and send the messages to the network device # A separately. Alternatively, the target data and the fourth indication information may be used as different fields and carried in a same piece of information. This is not particularly limited in embodiments of the present invention.

As described above, because encapsulation processing is performed on the target data by using the first protocol layer set and the second protocol layer set, the terminal device also needs to learn specific protocol layers included in the first protocol layer set and the second protocol layer set. Then based on corresponding protocol stack layers (namely, some or all protocol layers of the protocol stack # A', and some or all protocol layers of the protocol stack # B') provided in the terminal device, the terminal device can perform decapsulation processing on the target data to obtain the specific content of the target data.

In this embodiment of the present invention, the terminal device may determine, based on the RAT type indication information, to perform decapsulation processing by using the protocol stack # B'.

The following describes in detail a method for determining, by the terminal device, a protocol layer that is in the protocol stack # A' and corresponds to the first protocol layer set, and a protocol layer that is in the protocol stack # B' and corresponds to the second protocol layer set.

Method 1

Optionally, before the first network device sends, based on the first RAT to the terminal device, the target data and RAT type indication information that is used to indicate the second RAT, the method further includes:

the first network device performs, based on the first protocol layer set, encapsulation processing on the RAT type indication information that is used to indicate the second RAT.

Specifically, in this embodiment of the present invention, the network device # A may encapsulate the RAT type indication information into a corresponding data structure of the target data based on the second protocol layer set. Specifically, the target data may include a plurality of data structures, and each data structure is generated after encapsulation processing is performed by a corresponding protocol layer. Correspondingly, each data structure may be obtained after decapsulation processing is performed by the corresponding protocol layer.

For example, when the second protocol layer set includes the RRC layer, the target data after encapsulation processing by the first protocol layer set may include: an RRC data structure (namely, a data structure that is generated after encapsulation processing is performed by the RRC layer of the protocol stack # A, and may be obtained after decapsulation processing is performed by the RRC layer of the protocol stack # A'), a PDCP data structure (namely, a data structure that is generated after processing is performed by the PDCP layer of the protocol stack # A, and may be obtained after decapsulation processing is performed by the PDCP layer of the protocol stack # A'), an RLC data structure (namely, a data structure that is generated after processing is performed by the RLC layer of the protocol stack # A, and may be obtained after decapsulation processing is performed by the RLC layer of the protocol stack # A'), a MAC data structure (namely, a data structure that is generated after processing is performed by the MAC layer of the protocol stack # A, and may be obtained after decapsulation processing is performed by the MAC layer of the protocol stack # A'), and a PHY data structure (namely, a data structure that is generated after processing is performed by the PHY layer of the protocol stack # A, and may be obtained after decapsulation processing is performed by the PHY layer of the protocol stack # A').

In this case, the network device # A may encapsulate the RAT type indication information into the RRC data structure. Therefore, the terminal device obtains the RAT type indication information after performing decapsulation processing by using the RRC layer of the protocol stack # A', and may determine, based on the data structure (namely, the RRC data structure) used by the RAT type indication information, that the target data is data generated after processing is performed by the RRC layer of the protocol stack # B, and therefore, may enable the protocol stack # B', and further decapsulate, by using the RRC layer of the protocol stack # B', the RRC data structure that is obtained after decapsulation processing is performed by using the RRC layer of the protocol stack # A', so as to obtain the specific content of the target data.

For another example, when the second protocol layer set includes the RRC layer and the RLC layer (or the RRC layer, the PDCP layer, and the RLC layer), the target data after encapsulation processing by the first protocol layer set may include an RLC data structure, a MAC data structure, and a PHY data structure.

In this case, the network device # A may encapsulate the RAT type indication information into the RLC data structure. Therefore, the terminal device obtains the RAT type indication information after performing decapsulation processing by using the RLC layer of the protocol stack # A', and may determine, based on the data structure (namely, the RLC layer) used by the RAT type indication information, that the target data is data generated after processing is performed by the RLC layer of the protocol stack # B, and therefore, may enable the protocol stack # B', and further decapsulate, by using the RLC layer and the RRC layer (or the RLC layer, the PDCP layer, and the RRC layer) of the protocol stack # B', the RLC data structure that is obtained after decapsulation processing is performed by using the RLC layer of the protocol stack # A', so as to obtain the specific content of the target data.

For another example, when the second protocol layer set includes the RRC layer, the RLC layer, and the MAC layer (or the RRC layer, the PDCP layer, the RLC layer, and the MAC layer), the target data after encapsulation processing by the first protocol layer set may include a MAC data structure and a PHY data structure.

In this case, the network device # A may encapsulate the RAT type indication information into the MAC data structure. Therefore, the terminal device obtains the RAT type indication information after performing decapsulation processing by using the MAC layer of the protocol stack # A', and may determine, based on the data structure (namely, the MAC data structure) used by the RAT type indication information, that the target data is data generated after processing is performed by the MAC layer of the protocol stack # B, and therefore, may enable the protocol stack # B', and further decapsulate, by using the MAC layer, the RLC layer, and the RRC layer (or the MAC layer, the RLC layer, the PDCP layer, and the RRC layer) of the protocol stack # B', the MAC data structure that is obtained after decapsulation processing is performed by using the MAC layer of the protocol stack # A', so as to obtain the specific content of the target data.

For another example, when the second protocol layer set includes the PHY layer, the RRC layer, the RLC layer, and the MAC layer (or the PHY layer, the RRC layer, the PDCP layer, the RLC layer, and the MAC layer), the target data after encapsulation processing by the first protocol layer set may include a PHY data structure.

In this case, the network device # A may encapsulate the RAT type indication information into the PHY data structure. Therefore, the terminal device obtains the RAT type indication information after performing decapsulation processing by using the PHY layer of the protocol stack # A', and may determine, based on the data structure (namely, the PHY data structure) used by the RAT type indication information, that the target data is data generated after processing is performed by the PHY layer of the protocol stack # B, and therefore, may enable the protocol stack # B', and further decapsulate, by using the PHY layer, the MAC layer, the RLC layer, and the RRC layer (or the PHY layer, the MAC layer, the RLC layer, the PDCP layer, and the RRC layer) of the protocol stack # B', the PHY data structure that is obtained after decapsulation processing is performed by using the PHY layer of the protocol stack # A', so as to obtain the specific content of the target data.

Method 2

Optionally, the method further includes:

the first network device sends, based on the first RAT to the terminal device, the fourth indication information used to indicate the second protocol layer set.

Specifically, in this embodiment of the present invention, the network device # A may perform encapsulation processing on the fourth indication information by using the protocol stack # A, to generate information that the terminal device can receive by using the first RAT.

It should be noted that, in this embodiment of the present invention, the network device # A may add the target data and the fourth indication information to a same message (or a packet, or a data packet) and send the message to the terminal device. Alternatively, the network device # A may add the target data and the fourth indication information to different messages (or packets, or data packets) and send the messages to the terminal device separately. Alternatively, the target data and the fourth indication information may be used as different fields and carried in a same piece of information. This is not particularly limited in embodiments of the present invention.

Therefore, the terminal device can receive, by using the first RAT, the target data and the fourth indication information that are sent by the network device # A.

Therefore, the terminal device may perform decapsulation processing on the fourth indication information by using the protocol stack # A', to determine the second protocol layer set and the first protocol layer set.

In addition, the terminal device can perform decapsulation processing on the target data based on the first protocol layer set, and further decapsulate the obtained data based on the first protocol layer set, and therefore can obtain the content of the target data.

Specifically, for example, as shown in FIG. 3, when the target data is RRC layer data generated after the network device # B performs processing by using the RRC layer (namely, an example of the second protocol layer set) of the protocol stack # B, the target data sent by the network device # A is generated after the network device # A performs encapsulation processing on the target data by using the RRC layer, the PDCP layer, the RLC layer, the MAC layer, and the PHY layer (namely, an example of the first protocol layer set). In this case, the terminal device may determine the first protocol layer set (namely, including the RRC layer, the PDCP layer, the RLC layer, the MAC layer, and the PHY layer of the protocol stack # A) and the second protocol layer set (namely, including the RRC layer of the protocol stack # B) based on the fourth indication information, and perform decapsulation processing on the target data by using the protocol layers (namely, including the RRC layer, the PDCP layer, the RLC layer, the MAC layer, and the PHY layer of the protocol stack # A') corresponding to the first protocol layer set, and therefore can obtain the data that is generated after encapsulation processing is performed by the second protocol layer set and sent by the network device # B to the network device # A, and perform further decapsulation processing on the data based on the protocol layer (namely, including the RRC layer of the protocol stack # B') corresponding to the second protocol layer set, so as to determine the specific content of the target data.

For another example, when the target data is an RLC layer PDU generated after the network device # B performs processing by using the RRC layer and the RLC layer (namely, another example of the second protocol layer set) of the protocol stack # B, the target data sent by the network device # A is generated after the network device # A performs encapsulation processing on the target data by using the RLC layer, the MAC layer, and the PHY layer (namely, another example of the first protocol layer set) of the protocol stack # A. In this case, the terminal device may determine the first protocol layer set (namely, including the RLC layer, the MAC layer, and the PHY layer of the protocol stack # A) and the second protocol layer set (namely, including the RRC layer and the RLC layer of the protocol stack # B) based on the fourth indication information, and perform decapsulation processing on the target data by using the protocol layers (namely, including the RLC layer, the MAC layer, and the PHY layer of the protocol stack # N) corresponding to the first protocol layer set, and therefore can obtain the data that is generated after encapsulation processing is performed by the second protocol layer set and sent by the network device # B to the network device # A, and perform further decapsulation processing on the data based on the protocol layers (namely, including the RRC layer and the RLC layer of the protocol stack # B') corresponding to the second protocol layer set, so as to determine the specific content of the target data.

For another example, when the target data is a MAC layer PDU generated after the network device # B performs processing by using the RRC layer, the RLC layer, and the MAC layer (namely, another example of the second protocol layer set) of the protocol stack # B, the target data sent by the network device # A is generated after the network device # A performs encapsulation processing on the target data by using the MAC layer and the PHY layer (namely, another example of the first protocol layer set) of the protocol stack # A. In this case, the terminal device may determine the first protocol layer set (namely, including the MAC layer and the PHY layer of the protocol stack # A) and the second protocol layer set (namely, including the RRC layer, the RLC layer, and the MAC layer of the protocol stack # B) based on the fourth indication information, and perform decapsulation processing on the target data by using the protocol layers (namely, including the MAC layer and the PHY layer of the protocol stack # A') corresponding to the first protocol layer set, and therefore can obtain the data that is generated after encapsulation processing is performed by the second protocol layer set and sent by the network device # B to the network device # A, and perform further decapsulation processing on the data based on the protocol layers (namely, including the RRC layer, the RLC layer, and the MAC layer of the protocol stack # B') corresponding to the second protocol layer set, so as to determine the specific content of the target data.

It should be understood that, the specific protocol layers of the protocol stack # A' and the protocol stack # B' that are used when the terminal device processes the fourth indication information are merely examples, and embodiments of the present invention are not limited thereto. An adaptive change may be made based on the specific protocol layer of the protocol stack # A used when the network device # A generates the target data (or the protocol stack # B used when the network device # B generates the target data).

In addition, the processing procedure and method of each protocol layer in the terminal device may be similar to those in the prior art. Herein to avoid repetition, detailed descriptions thereof are omitted.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data.

Specifically, in this embodiment of the present invention, data of different data types may be generated by the network device # B by using different protocol layers. For example, the RRC layer data may be generated after the network device # B performs processing by using the RRC layer, the RLC layer data may be generated after the network device # B performs processing by using the RLC layer, and the MAC layer data may be generated after the network device # B performs processing by using the MAC layer. In this case, the terminal device needs to learn the data type of the received target data only, and can determine the protocol layer that is in the protocol stack # B and is used for performing decapsulation processing on the target data. Therefore, in this embodiment of the present invention, protocol layers used when encapsulation (or decapsulation) processing is performed on various types of data may be provided in advance. For example, a mapping relationship between data and the protocol layer is stored in the network device and the terminal device, and both the network device and the terminal device perform data processing based on the mapping relationship, and therefore, the data type information corresponding to the target data may be used as the fourth indication information.

Optionally, a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

Specifically, in this embodiment of the present invention, the fourth indication information may also be indication information of a lowest protocol layer in the second protocol layer set. For example, when the target data generated by the network device # B is a MAC layer PDU, the second protocol layer set includes the RRC layer, the RLC layer, and the MAC layer. In this case, an identifier that can uniquely indicate the MAC layer may be used as the fourth indication information. Therefore, when receiving the identifier of the MAC layer, the terminal device may determine that the second protocol layer set includes a protocol layer above the MAC layer of the protocol stack # B, and may further perform decapsulation processing, by using the PHY layer and the MAC layer of the protocol stack # A', on the target data sent by the network device # A, and perform further decapsulation processing on the obtained data by using the RRC layer, the RLC layer, and the MAC layer of the protocol stack # B'.

Alternatively, the fourth indication information may be indication information of a highest protocol layer in the first protocol layer set. For example, when the target data generated by the network device # B is a MAC layer PDU, the first protocol layer set includes the MAC layer and the PHY layer. In this case, an identifier that can uniquely indicate the MAC layer may be used as the fourth indication information. Therefore, when receiving the identifier of the MAC layer, the terminal device may determine that the second protocol layer set includes a protocol layer above the MAC layer of the protocol stack # B, and may further perform decapsulation processing, by using the PHY layer and the MAC layer of the protocol stack # A', on the target data sent by the network device # A, and perform further decapsulation processing on the obtained data by using the RRC layer, the RLC layer, and the MAC layer of the protocol stack # B'.

By using the foregoing method 1 or method 2, the terminal device can accurately determine the protocol layer used for decapsulation processing. This can improve efficiency, increase a data processing speed, and further improve user experience.

Optionally, the negotiation processing performed between the first network device and the second network device includes:

the first network device performs negotiation processing with the second network device to determine that the second network device is located within coverage of the terminal device.

Specifically, the network device # A may determine, from one or more network devices in the system, the network device # B within the coverage of the terminal device, that is, the network device # B is within the coverage of the terminal device and therefore can receive the uplink data sent by the terminal device.

The following uses an example to describe a method for determining, by the network device # A, that the network device # B is located within the coverage of the terminal device.

Optionally, that the first network device performs negotiation processing with the second network device to determine that the second network device is located within coverage of the terminal device includes:

the first network device receives a device identifier of the terminal device that is sent by the second network device, wherein the device identifier of the terminal device is sent after the second network device receives, by using the second RAT, a signal that carries the device identifier of the terminal device and is sent by the terminal device; and the first network device determines, based on the device identifier of the terminal device, that the second network device is located within the coverage of the terminal device.

Specifically, in this embodiment of the present invention, a communications connection, for example, a communications connection that is implemented by using an optical fiber, a copper wire, a radio link, or the like, may be provided between the first network device and the foregoing candidate network device (for example, between the network device # A and the network device # B).

In this embodiment of the present invention, the terminal device supporting the second RAT may use the second RAT to send the signal carrying the device identifier of the terminal device, for example, a reference signal.

It should be noted that, the foregoing illustrated reference signal is merely an example, and embodiments of the present invention are not limited thereto. All other signals that can carry the device identifier of the terminal device shall fall within the protection scope of embodiments of the present invention.

In addition, the device identifier of the terminal device may be used to uniquely indicate the terminal device, for example, may be a mobile phone number of the terminal device.

In addition, in this embodiment of the present invention, the process in which the terminal device uses the second RAT to send the signal carrying the device identifier of the terminal device may be performed periodically, or may be performed based on an instruction of the network device # A when the network device # A determines that the uplink data of the terminal device needs to be received by using another network device. This is not particularly limited in embodiments of the present invention.

When the terminal device moves, for example, to a position shown in FIG. 1, the network device # B is located within the coverage of the terminal device, that is, the network device # B can use the second RAT to receive the signal that carries the device identifier of the terminal device and is sent by the terminal device. Therefore, the network device # B may determine, based on the signal, that the network device # B is located within the coverage of the terminal device, that is, the network device # B can receive the uplink data sent by the terminal device.

Further, the network device # B may send, to the network device # A by using the foregoing communications connection, indication information indicating that the network device # B is located within the coverage of the terminal device (or the network device # B can receive the uplink data sent by the terminal device). For example, the indication information may include the device identifier of the terminal device.

Therefore, based on the indication information (for example, the device identifier of the terminal device) that comes from the network device # B and indicates that the network device # B is located within the coverage of the terminal device, the network device # A may determine that the network device # B is located within the coverage of the terminal device.

In addition, when the signal carrying the device identifier of the terminal device is a reference signal, the network device # B may further measure a channel between the terminal device and the network device # B based on the reference signal, and further determine, based on a measurement result, whether the network device # B can effectively serve the terminal device (for example, whether the uplink data sent by the terminal device can be received correctly), and determine, based on the measurement result, that channel quality of the channel between the terminal device and the network device # B is relatively high (for example, higher than a preset threshold). In this case, the network device # B may send, to the network device # A, the indication information indicating that the network device # B is located within the coverage of the terminal device (or the network device # B can receive the uplink data sent by the terminal device).

Alternatively, when the signal carrying the device identifier of the terminal device is a reference signal, the network device # B may further measure a channel between the terminal device and the network device # B based on the reference signal, and send, to the network device # A, both a measurement result and the indication information indicating that the network device # B is located within the coverage of the terminal device (or the network device # B can receive the uplink data sent by the terminal device). Therefore, the network device # A may determine, based on the measurement result, whether the network device # A can effectively serve the terminal device (for example, whether the uplink data sent by the terminal device can be received correctly), and when determining, based on the measurement result, that channel quality of the channel between the terminal device and the network device # B is relatively high (for example, higher than a preset threshold), determine that the network device # B is located within the coverage of the terminal device.

It should be understood that, the foregoing illustrated method and process of determining, by the network device # A, whether the network device # B is located within the coverage of the terminal device are merely examples, and embodiments of the present invention are not limited thereto. For example, the network device # A may further obtain in advance, from a network operator, indication information used to indicate a location of the network device # B, and obtain, from the terminal device, indication information indicating a location and coverage of the terminal device, and therefore, may determine, based on the foregoing indication information, whether the network device # B is located within the coverage of the terminal device. For example, in this embodiment of the present invention, a general terminal device positioning method such as a base station positioning method or a global positioning system (GPS, Global Position System) positioning method may be used to perform positioning on the terminal device to determine the location of the terminal device.

Optionally, the terminal device is located beyond coverage of the second network device.

Specifically, as shown in FIG. 1, when the terminal device is located beyond the coverage of the second network device, because what the second network device sends, for example, system information or broadcast information, cannot be sent to the terminal device, the terminal device cannot complete access processing for the second network device, and cannot receive scheduling information delivered by the second network device, that is, based on the prior art, the terminal device cannot send uplink data to the second network device.

In contrast, in the method 200 for wireless communication according to this embodiment of the present invention, because the first network device delivers, to the terminal device, the indication information of the target radio resource allocated or granted by the second network device, even if the second network device is located beyond the coverage of the terminal device, the second network device can still complete resource scheduling for the terminal device, so that the terminal device can send the uplink data to the second network device.

It should be understood that, a position relationship between the terminal device and the second network device shown in FIG. 1 is merely an example, and the embodiments of present invention are not limited thereto, as long as it is ensured that the second network device is located within the coverage of the terminal device. For example, the terminal device may also be located within the coverage of the second network device.

It should be noted that, in this embodiment of the present invention, the first network device may encapsulate the target data and the RAT type indication information that is used to indicate the second RAT into a same data packet, and send the data packet to the terminal device, or the first network device may encapsulate the target data and the RAT type indication information that is used to indicate the second RAT into different data packets, and send the data packets to the terminal device separately. This is not particularly limited in embodiments of the present invention.

In addition, in this embodiment of the present invention, the target data may be user plane data, or may be control plane data. This is not particularly limited in embodiments of the present invention.

In addition, in this embodiment of the present invention, when the network device # B transmits information (for example, system broadcast information or feedback information such as the indication information of the target radio resource and the indication information of the second RAT) to the terminal device by using the network device # A, the network device # B may further transmit indication information of an attribute of the information to the network device # A, and the attribute of the information is further transmitted to the terminal device. Therefore, the terminal device can perform adaptive processing based on the attribute of the information.

Herein the "attribute" may include a plane to which the information belongs, that is, control plane information or user plane information.

Alternatively, the "attribute" may further include an RAT used for transmitting or receiving the information.

Alternatively, the "attribute" may further include a protocol layer used for transmitting or receiving the information.

In this embodiment of the present invention, after the terminal device determines the target radio resource based on the first indication information, the terminal device may send the uplink data to the network device # B by using the target radio resource and the second RAT. In addition, the method and process of transmitting the uplink data between the terminal device and the network device # B may be similar to those in the prior art. Herein to avoid repetition, detailed descriptions thereof are omitted.

Based on the method for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

FIG. 4 is a schematic flowchart of a method 300 for wireless communication according to another embodiment of the present invention. The method is described from a perspective of a second network device. As shown in FIG. 4, the method 300 includes the following operations.

An operation S310. At operation S310, a second network device negotiates with a first network device, so that the first network device determines target data and sends the target data to a terminal device, wherein the first network device supports wireless communication based on a first radio access technology RAT, and the second network device supports wireless communication based on a second RAT.

The target data includes at least one of a plurality of types of data as follows:

radio resource indication information, system information of the second network device, a radio resource control RRC message generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

Optionally, when the target data includes the radio resource indication information, the negotiation processing performed between the first network device and the second network device includes:

the second network device sends, to the first network device, first indication information used to indicate the radio resources allocated or granted by the second network device.

Optionally, when the target data includes the radio resource indication information, the negotiation processing performed between the first network device and the second network device includes:

the second network device receives second indication information sent by the first network device and used to indicate a data volume of uplink data that the terminal device needs to send to the second network device;

the second network device determines the target radio resource based on the second indication information; and the second network device sends, to the first network device, third indication information used to indicate the target radio resource.

Optionally, when the target data includes the radio resource indication information, the method 300 further includes:

An operation S320. At operation S320, the second network device receives, based on the second RAT and by using the target radio resource, uplink data sent by the terminal device.

Optionally, a second protocol stack used to perform wireless communication based on the second RAT is provided in the second network device and the terminal device; and the negotiation processing performed between the second network device and the first network device includes:

the second network device determines a second protocol layer set, wherein the second protocol layer set includes at least one protocol layer in the second protocol stack;

the second network device performs encapsulation processing based on the second protocol layer set to generate the target data; and the second network device sends, to the first network device, the target data and fourth indication information used to indicate the second protocol layer set.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

Actions and functions of the first network device in the method 300 are similar to actions and functions of the first network device (for example, the network device # A) in the foregoing method 200. Actions and functions of the second network device in the method 300 are similar to actions and functions of the second network device (for example, the network device # B) in the foregoing method 200. In addition, actions and functions of the terminal device in the method 300 are similar to actions and functions of the terminal device in the foregoing method 200. Herein to avoid repetition, detailed descriptions thereof are omitted.

Based on the method for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

FIG. 5 is a schematic flowchart of a method 400 for wireless communication according to another embodiment of the present invention. The method is described from a perspective of a terminal device. The method 400 is performed in a communications system including at least two network devices. The first network device supports wireless communication based on a first radio access technology RAT, and the second network device supports wireless communication based on a second RAT. As shown in FIG. 5, the method 400 includes:

An operation S410. At operation S410, a terminal device receives, based on the first RAT, target data and RAT type indication information that are sent by the first network device, wherein the RAT type indication information is used to indicate the second RAT.

The target data is determined after the first network device negotiates with the second network device, and the target data includes at least one of a plurality of types of data as follows:

radio resource indication information, system information of the second network device, an RRC message generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

Optionally, when the target data includes the radio resource indication information, the method 400 further includes:

An operation S420. At operation S420, the terminal device determines the second RAT based on the RAT type indication information.

An operation S430. At operation S430, the terminal device sends, based on the second RAT and by using the target radio resource, uplink data to the second network device.

Optionally, a second protocol stack used to perform wireless communication based on the second RAT is provided in the second network device and the terminal device, the target data is generated by the second network device after the second network device performs encapsulation processing by using a second protocol layer set, and the second protocol layer set includes at least one protocol layer in the second protocol stack; a first protocol stack used to perform wireless communication based on the first RAT is provided in the first network device and the terminal device, the target data is encapsulated by the first network device based on a first protocol layer set, the first protocol layer set includes at least one protocol layer in the first protocol stack, and the first protocol layer set is determined by the first network device according to fourth indication information sent by the second network device and used to indicate the second protocol layer set; and the method further includes:

the terminal device determines the second protocol stack based on the RAT type indication information;

the terminal device determines the second protocol layer set from the second protocol stack; and the terminal device performs decapsulation processing on the target data based on the first protocol layer set and the second protocol layer set.

Optionally, the RAT type indication information of the second RAT is generated by the first network device after the first network device performs encapsulation processing based on the first protocol layer set; and the method further includes:

the terminal device determines the second protocol layer set from the second protocol stack based on the protocol layer that is in the first protocol stack and is used when the RAT type indication information is obtained.

Optionally, that the terminal device determines the second protocol layer set from the second protocol stack includes:

the terminal device receives, based on the first RAT, the fourth indication information sent by the first network device and used to indicate the second protocol layer set; and the terminal device determines the second protocol layer set from the second protocol stack based on the fourth indication information.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

Actions and functions of the first network device in the method 400 are similar to actions and functions of the first network device (for example, the network device # A) in the foregoing method 200. Actions and functions of the second network device in the method 400 are similar to actions and functions of the second network device (for example, the network device # B) in the foregoing method 200. In addition, actions and functions of the terminal device in the method 400 are similar to actions and functions of the terminal device in the foregoing method 200. Herein to avoid repetition, detailed descriptions thereof are omitted.

Based on the method for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

Figure 6:
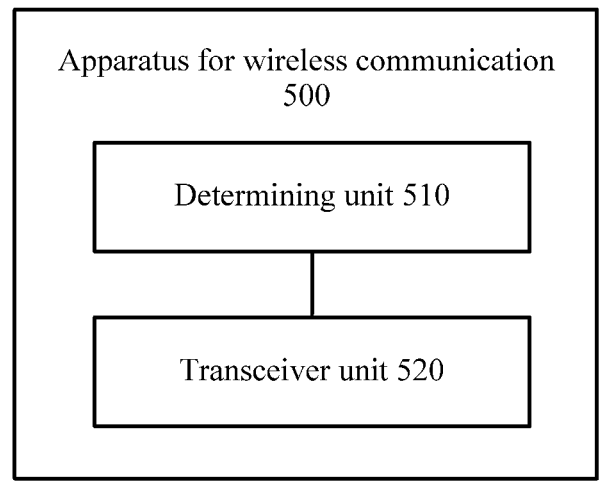
FIG. 6 is a schematic block diagram of an apparatus for wireless communication according to an embodiment of the present invention.

FIG. 6 is a schematic block diagram of an apparatus 500 for wireless communication according to an embodiment of the present invention. As shown in FIG. 6, the apparatus 500 includes:

a determining unit 510, configured to control a transceiver unit 520 to negotiate with a second network device to determine target data, wherein the apparatus supports wireless communication based on a first radio access technology RAT, and the second network device supports wireless communication based on a second RAT; and the transceiver unit 520, configured to send, based on the first RAT to a terminal device, the target data and RAT type indication information that is used to indicate the second RAT; wherein the target data includes at least one of a plurality of types of data as follows:

radio resource indication information, system information of the second network device, an RRC message generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

Optionally, when the target data includes the radio resource indication information, the transceiver unit is specifically configured to receive first indication information sent by the second network device and used to indicate the radio resources allocated or granted by the second network device; and the determining unit is specifically configured to determine, based on the first indication information, the target radio resource from the radio resources allocated or granted by the second network device, and generate the radio resource indication information based on the target radio resource.

Optionally, when the target data includes the radio resource indication information, the transceiver unit is specifically configured to send, to the second network device, second indication information used to indicate a data volume of uplink data that the terminal device needs to send to the second network device;

the transceiver unit is specifically configured to receive third indication information sent by the second network device based on the second indication information and used to indicate the target radio resource; and the determining unit is specifically configured to generate the radio resource indication information based on the third indication information.

Optionally, a second protocol stack used to perform wireless communication based on the second RAT is provided in the second network device and the terminal device, the target data is generated by the second network device after the second network device performs encapsulation processing by using a second protocol layer set, the second protocol layer set includes at least one protocol layer in the second protocol stack, and a first protocol stack used to perform wireless communication based on the first RAT is provided in the apparatus and the terminal device;

the transceiver unit is further configured to receive fourth indication information sent by the second network device and used to indicate the second protocol layer set;

the determining unit is further configured to determine a first protocol layer set based on the fourth indication information, wherein the first protocol layer set includes at least one protocol layer in the first protocol stack; and the transceiver unit is further configured to perform encapsulation processing on the target data based on the first protocol layer set.

Optionally, the transceiver unit is further configured to perform, based on the first protocol layer set, encapsulation processing on the RAT type indication information that is used to indicate the second RAT.

Optionally, the transceiver unit is further configured to send, based on the first RAT to a terminal device, the fourth indication information used to indicate the second protocol layer set.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

The units or modules in the apparatus 500 are respectively configured to perform actions and functions performed by the first network device (for example, the network device # A) in the foregoing method 200. Actions and functions of the second network device are similar to actions and functions of the second network device (for example, the network device # B) in the foregoing method 200. In addition, actions and functions of the terminal device are similar to actions and functions of the terminal device in the foregoing method 200. Herein to avoid repetition, detailed descriptions thereof are omitted.

Based on the apparatus for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

Figure 7:
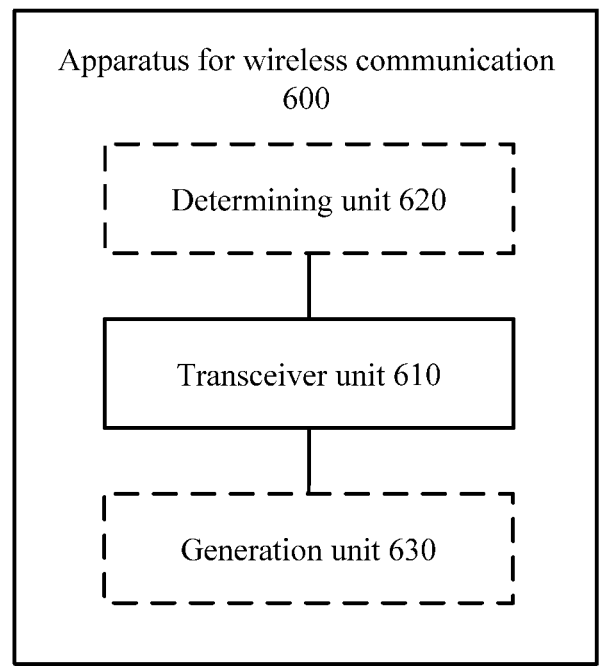
FIG. 7 is a schematic block diagram of an apparatus for wireless communication according to another embodiment of the present invention.

FIG. 7 is a schematic block diagram of an apparatus 600 for wireless communication according to another embodiment of the present invention. As shown in FIG. 7, the apparatus 600 includes:

a transceiver unit 610, configured to negotiate with a first network device, so that the first network device determines target data and sends the target data to a terminal device, wherein the apparatus supports wireless communication based on a second radio access technology RAT, the first network device supports wireless communication based on a first radio access technology RAT, and the target data includes at least one of a plurality of types of data as follows:

radio resource indication information, system information of the apparatus, a radio resource control RRC message generated by the apparatus, radio link control RLC layer data generated by the apparatus, or media access control MAC layer data generated by the apparatus, wherein the radio resource indication information is used to indicate a target radio resource in radio resources allocated or granted by the apparatus, and the target radio resource is used to perform wireless communication based on the second RAT between the terminal device and the apparatus.

Optionally, when the target data includes the radio resource indication information, the transceiver unit is specifically configured to send, to the first network device, first indication information used to indicate the radio resources allocated or granted by the apparatus.

Optionally, the transceiver unit is specifically configured to receive second indication information sent by the first network device and used to indicate a data volume of uplink data that the terminal device needs to send to the apparatus;

the apparatus further includes:

a determining unit 620, configured to determine the target radio resource based on the second indication information; and the transceiver unit is specifically configured to send, to the first network device, third indication information used to indicate the target radio resource.

Optionally, when the target data includes the radio resource indication information, the transceiver unit is further configured to receive, based on the second RAT and by using the target radio resource, the uplink data sent by the terminal device.

Optionally, a second protocol stack used to perform wireless communication based on the second RAT is provided in the apparatus and the terminal device;

the apparatus further includes a generation unit 630, configured to determine a second protocol layer set, wherein the second protocol layer set includes at least one protocol layer in the second protocol stack, and perform encapsulation processing based on the second protocol layer set to generate the target data; and the transceiver unit is specifically configured to send, to the first network device, the target data and fourth indication information used to indicate the second protocol layer set.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

The units or modules in the apparatus 600 are respectively configured to perform actions and functions performed by the second network device (for example, the network device # B) in the foregoing method 300. Actions and functions of the first network device are similar to actions and functions of the first network device (for example, the network device # A) in the foregoing method 200. In addition, actions and functions of the terminal device are similar to actions and functions of the terminal device in the foregoing method 200. Herein to avoid repetition, detailed descriptions thereof are omitted.

Based on the apparatus for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

Figure 8:
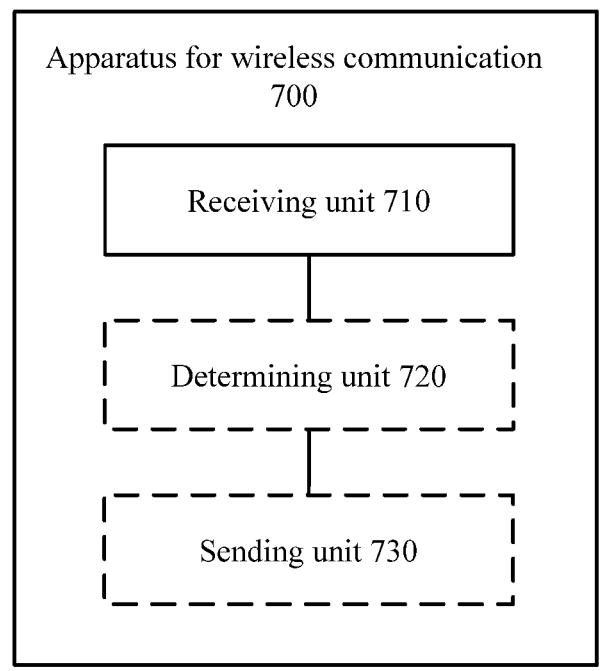
FIG. 8 is a schematic block diagram of an apparatus for wireless communication according to another embodiment of the present invention.

FIG. 8 is a schematic block diagram of an apparatus 700 for wireless communication according to another embodiment of the present invention. The apparatus 700 is configured in a communications system including at least two network devices. The first network device supports wireless communication based on a first radio access technology RAT, and the second network device supports wireless communication based on a second RAT. As shown in FIG. 8, the apparatus 700 includes:

a receiving unit 710, configured to receive, based on the first RAT, target data and RAT type indication information that are sent by the first network device, wherein the RAT type indication information is used to indicate the second RAT; wherein the target data is determined after the first network device negotiates with the second network device, and the target data includes at least one of a plurality of types of data as follows:

radio resource indication information, system information of the second network device, an RRC message generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the apparatus and the second network device.

Optionally, when the target data includes the radio resource indication information, the apparatus further includes:

a determining unit 720, configured to determine the second RAT based on the RAT type indication information; and a sending unit 730, configured to send, based on the second RAT and by using the target radio resource, uplink data to the second network device.

Optionally, a second protocol stack used to perform wireless communication based on the second RAT is provided in the second network device and the apparatus, the target data is generated by the second network device after the second network device performs encapsulation processing by using a second protocol layer set, and the second protocol layer set includes at least one protocol layer in the second protocol stack; a first protocol stack used to perform wireless communication based on the first RAT is provided in the first network device and the terminal device, the target data is encapsulated by the first network device based on a first protocol layer set, the first protocol layer set includes at least one protocol layer in the first protocol stack, and the first protocol layer set is determined by the first network device according to fourth indication information sent by the second network device and used to indicate the second protocol layer set; and the apparatus further includes:

a determining unit 720, configured to determine the second protocol stack based on the RAT type indication information, and determine the second protocol layer set from the second protocol stack; and a processing unit 740 (not shown), configured to perform decapsulation processing on the target data based on the first protocol layer set and the second protocol layer set.

Optionally, the RAT type indication information of the second RAT is generated by the first network device after the first network device performs encapsulation processing based on the first protocol layer set; and the determining unit is specifically configured to determine the second protocol layer set from the second protocol stack based on the protocol layer that is in the first protocol stack and is used when the RAT type indication information is obtained.

Optionally, the receiving unit is further configured to receive, based on the first RAT, the fourth indication information sent by the first network device and used to indicate the second protocol layer set; and the determining unit is specifically configured to determine the second protocol layer set from the second protocol stack based on the fourth indication information.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

The units or modules in the apparatus 700 are respectively configured to perform actions and functions performed by the terminal device in the foregoing method 400. Actions and functions of the first network device are similar to actions and functions of the first network device (for example, the network device # A) in the foregoing method 200. In addition, actions and functions of the second network device are similar to actions and functions of the second network device (for example, the network device # B) in the foregoing method 200. Herein to avoid repetition, detailed descriptions thereof are omitted.

Based on the apparatus for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

Figure 9:
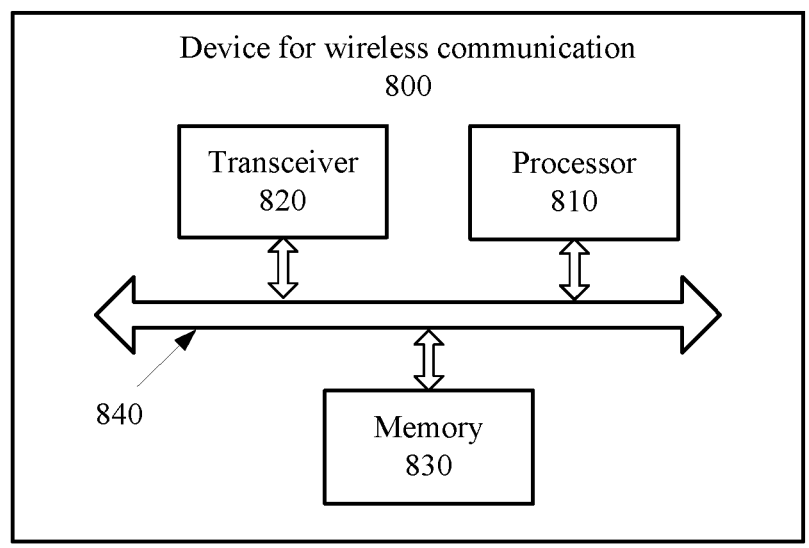
FIG. 9 is a schematic structural diagram of a device for wireless communication according to an embodiment of the present invention.

FIG. 9 is a schematic structural diagram of a device 800 for wireless communication according to an embodiment of the present invention. As shown in FIG. 9, the device 800 includes a processor 810 and a transceiver 820. The processor 810 is connected to the transceiver 820. Optionally, the device 800 further includes a memory 830, and the memory 830 is connected to the processor 810. Further optionally, the device 800 includes a bus system 840. The processor 810, the memory 830, and the transceiver 820 may be connected by the bus system 840. The memory 830 may be configured to store an instruction. The processor 810 is configured to execute the instruction stored in the memory 830, so as to control the transceiver 820 to receive information or a signal.

The processor 810 is configured to control the transceiver 820 to negotiate with a second network device to determine target data, wherein the device 800 supports wireless communication based on a first radio access technology RAT, and the second network device supports wireless communication based on a second RAT.

The processor 810 is configured to control the transceiver 820 to send, based on the first RAT to the terminal device, the target data and RAT type indication information that is used to indicate the second RAT.

The target data includes at least one of a plurality of types of data as follows:

radio resource indication information, system information of the second network device, a radio resource control RRC message generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the terminal device and the second network device.

Optionally, when the target data includes the radio resource indication information, the processor 810 is configured to control the transceiver 820 to receive first indication information sent by the second network device and used to indicate the radio resources allocated or granted by the second network device; and the processor 810 is specifically configured to determine, based on the first indication information, the target radio resource from the radio resources allocated or granted by the second network device, and generate the radio resource indication information based on the target radio resource.

Optionally, when the target data includes the radio resource indication information, the processor 810 is configured to control the transceiver 820 to send, to the second network device, second indication information used to indicate a data volume of uplink data that the terminal device needs to send to the second network device;

the processor 810 is configured to control the transceiver 820 to receive third indication information sent by the second network device based on the second indication information and used to indicate the target radio resource; and the processor 810 is specifically configured to generate the radio resource indication information based on the third indication information.

Optionally, a second protocol stack used to perform wireless communication based on the second RAT is provided in the second network device and the terminal device, the target data is generated by the second network device after the second network device performs encapsulation processing by using a second protocol layer set, the second protocol layer set includes at least one protocol layer in the second protocol stack, and a first protocol stack used to perform wireless communication based on the first RAT is provided in the device and the terminal device;

the processor 810 is configured to control the transceiver 820 to receive fourth indication information sent by the second network device and used to indicate the second protocol layer set;

the processor 810 is further configured to determine a first protocol layer set based on the fourth indication information, wherein the first protocol layer set includes at least one protocol layer in the first protocol stack; and the processor 810 is further configured to perform encapsulation processing on the target data based on the first protocol layer set.

Optionally, the processor 810 is configured to perform, based on the first protocol layer set, encapsulation processing on the RAT type indication information that is used to indicate the second RAT.

Optionally, the processor 810 is configured to control the transceiver 820 to send, based on the first RAT to the terminal device, the fourth indication information used to indicate the second protocol layer set.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

It should be understood that, in this embodiment of the present invention, the processor 810 may be a central processing unit (CPU), or the processor 810 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

The memory 830 may include a read-only memory and a random access memory, and provide an instruction and data to the processor 810. A part of the memory 830 may further include a non-volatile random access memory. For example, the memory 830 may further store information about a device type.

The bus system 840 may further include a power bus, a control bus, a status signal bus, and the like, in addition to a data bus. However, for clear description, various buses in the figure are marked as the bus system 840.

In an implementation process, each operation of the foregoing method may be completed by using an integrated logic circuit of hardware in the processor 810 or an instruction in a form of software. The operations of the method disclosed with reference to the embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 830. The processor 810 reads information in the memory 830 and completes the operations of the foregoing method in combination with hardware of the processor 810. To avoid repetition, details are not described again herein.

The units or modules in the device 800 are respectively configured to perform actions and functions performed by the first network device (for example, the network device # A) in the foregoing method 200. Actions and functions of the second network device are similar to actions and functions of the second network device (for example, the network device # B) in the foregoing method 200. In addition, actions and functions of the terminal device are similar to actions and functions of the terminal device in the foregoing method 200. Herein to avoid repetition, detailed descriptions thereof are omitted.

Based on the device for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

Figure 10:
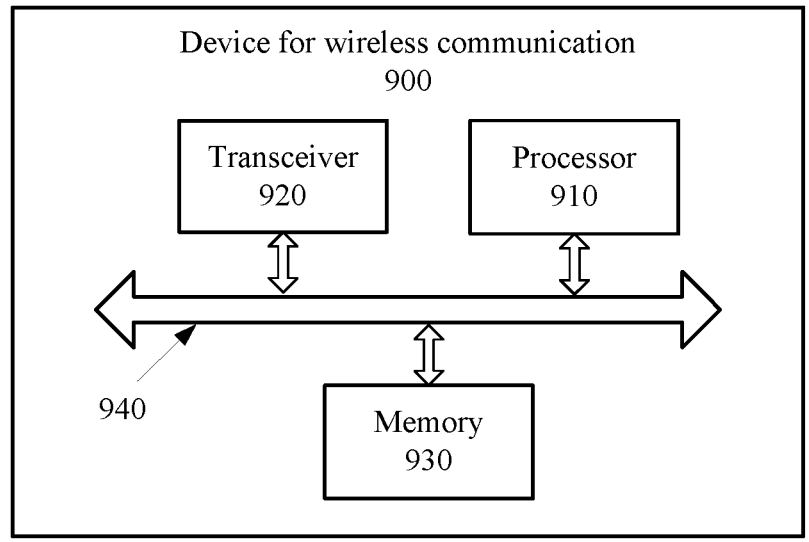
FIG. 10 is a schematic structural diagram of a device for wireless communication according to another embodiment of the present invention.

FIG. 10 is a schematic structural diagram of a device 900 for wireless communication according to another embodiment of the present invention. As shown in FIG. 10, the device 900 includes a processor 910 and a transceiver 920. The processor 910 is connected to the transceiver 920. Optionally, the device 900 further includes a memory 930, and the memory 930 is connected to the processor 910. Further optionally, the device 900 includes a bus system 940. The processor 910, the memory 930, and the transceiver 920 may be connected by the bus system 940. The memory 930 may be configured to store an instruction. The processor 910 is configured to execute the instruction stored in the memory 930, so as to control the transceiver 920 to receive information or a signal.

The processor 910 is configured to control the transceiver 920 to negotiate with a first network device, so that the first network device determines target data and sends the target data to a terminal device, wherein the first network device supports wireless communication based on a first radio access technology RAT, the device 900 supports wireless communication based on a second RAT, and the target data includes at least one of a plurality of types of data as follows:

radio resource indication information, system information of the device, a radio resource control RRC message generated by the device, radio link control RLC layer data generated by the device, or media access control MAC layer data generated by the device, wherein the radio resource indication information is used to indicate a target radio resource in radio resources allocated or granted by the device, and the target radio resource is used to perform wireless communication based on the second RAT between the terminal device and the device 900.

Optionally, when the target data includes the radio resource indication information, the processor 910 is configured to control the transceiver 920 to send, to the first network device, first indication information used to indicate the radio resources allocated or granted by the device.

Optionally, the processor 910 is configured to control the transceiver 920 to receive second indication information sent by the first network device and used to indicate a data volume of uplink data that the terminal device needs to send to the device;

the processor 910 determines the target radio resource based on the second indication information; and the processor 910 is configured to control the transceiver 920 to send, to the first network device, third indication information used to indicate the target radio resource.

Optionally, when the target data includes the radio resource indication information, the processor 910 is configured to control the transceiver 920 to receive, based on the second RAT and by using the target radio resource, the uplink data sent by the terminal device.

Optionally, a second protocol stack used to perform wireless communication based on the second RAT is provided in the device and the terminal device;

the processor 910 is configured to determine a second protocol layer set, wherein the second protocol layer set includes at least one protocol layer in the second protocol stack, and performs encapsulation processing based on the second protocol layer set to generate the target data; and the processor 910 is configured to control the transceiver 920 to send, to the first network device, the target data and fourth indication information used to indicate the second protocol layer set.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

It should be understood that, in this embodiment of the present invention, the processor 910 may be a central processing unit (CPU), or the processor 910 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

The memory 930 may include a read-only memory and a random access memory, and provide an instruction and data to the processor 910. A part of the memory 930 may further include a non-volatile random access memory. For example, the memory 930 may further store information about a device type.

The bus system 940 may further include a power bus, a control bus, a status signal bus, and the like, in addition to a data bus. However, for clear description, various buses in the figure are marked as the bus system 940.

In an implementation process, each operation of the foregoing method may be completed by using an integrated logic circuit of hardware in the processor 910 or an instruction in a form of software. The operations of the method disclosed with reference to the embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 930. The processor 910 reads information in the memory 930 and completes the operations of the foregoing method in combination with hardware of the processor 910. To avoid repetition, details are not described again herein.

The units or modules in the device 900 are respectively configured to perform actions and functions performed by the second network device (for example, the network device # B) in the foregoing method 300. Actions and functions of the first network device are similar to actions and functions of the first network device (for example, the network device # A) in the foregoing method 200. In addition, actions and functions of the terminal device are similar to actions and functions of the terminal device in the foregoing method 200. Herein to avoid repetition, detailed descriptions thereof are omitted.

Based on the device for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

Figure 11:
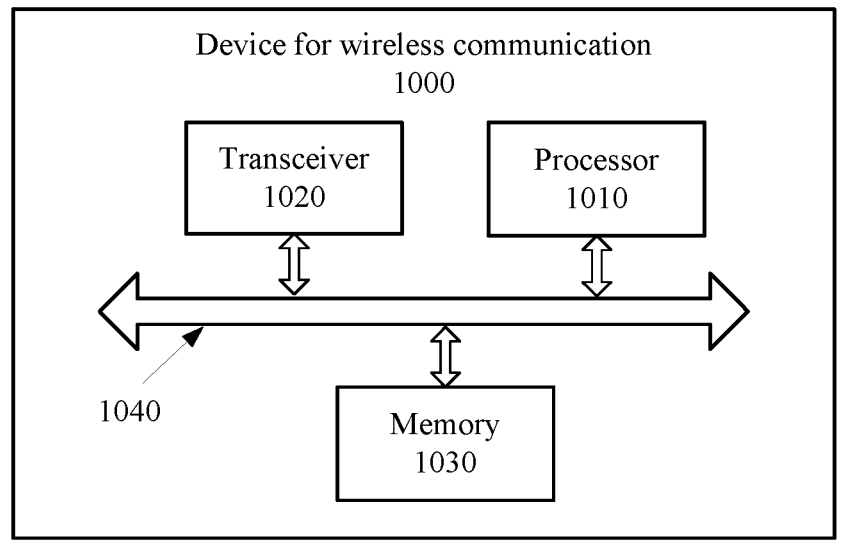
FIG. 11 is a schematic structural diagram of a device for wireless communication according to another embodiment of the present invention.

FIG. 11 is a schematic structural diagram of a device 1000 for wireless communication according to another embodiment of the present invention. The device 1000 is configured in a communications system including at least two network devices. The first network device supports wireless communication based on a first radio access technology RAT, and the second network device supports wireless communication based on a second RAT. As shown in FIG. 11, the device 1000 includes a processor 1010 and a transceiver 1020. The processor 1010 is connected to the transceiver 1020. Optionally, the device 1000 further includes a memory 1030, and the memory 1030 is connected to the processor 1010. Further optionally, the device 1000 includes a bus system 1040. The processor 1010, the memory 1030, and the transceiver 1020 may be connected by the bus system 1040. The memory 1030 may be configured to store an instruction. The processor 1010 is configured to execute the instruction stored in the memory 1030, so as to control the transceiver 1020 to receive information or a signal.

The processor 1010 is configured to control the transceiver 1020 to receive, based on the first RAT, target data and RAT type indication information that are sent by the first network device, wherein the RAT type indication information is used to indicate the second RAT; wherein the target data is determined after the first network device negotiates with the second network device, and the target data includes at least one of a plurality of types of data as follows:

radio resource indication information, system information of the second network device, a radio resource control RRC message generated by the second network device, radio link control RLC layer data generated by the second network device, or media access control MAC layer data generated by the second network device, wherein the radio resource indication information is used to indicate a target radio resource in radio resources allocated or granted by the second network device, and the target radio resource is used to perform wireless communication based on the second RAT between the device and the second network device.

Optionally, when the target data includes the radio resource indication information, the processor 1010 is configured to determine the second RAT based on the RAT type indication information; and the processor 1010 is configured to control the transceiver 1020 to send, based on the second RAT and by using the target radio resource, uplink data to the second network device.

Optionally, a second protocol stack used to perform wireless communication based on the second RAT is provided in the second network device and the device, the target data is generated by the second network device after the second network device performs encapsulation processing by using a second protocol layer set, and the second protocol layer set includes at least one protocol layer in the second protocol stack; a first protocol stack used to perform wireless communication based on the first RAT is provided in the first network device and the device, the target data is encapsulated by the first network device based on a first protocol layer set, the first protocol layer set includes at least one protocol layer in the first protocol stack, and the first protocol layer set is determined by the first network device according to fourth indication information sent by the second network device and used to indicate the second protocol layer set.

Optionally, the processor 1010 is configured to determine, based on the RAT type indication information, the second protocol stack corresponding to the second RAT;

the processor 1010 is configured to determine the second protocol layer set from the second protocol stack, wherein the second protocol layer set includes the at least one protocol layer in the second protocol stack; and the processor 1010 is configured to perform decapsulation processing on the target data based on the first protocol layer set and the second protocol layer set, wherein the first protocol layer set includes the at least one protocol layer in the first protocol stack corresponding to the first RAT.

Optionally, the RAT type indication information of the second RAT is generated by the first network device after the first network device performs encapsulation processing based on the first protocol layer set.

Optionally, the processor 1010 is configured to determine the second protocol layer set from the second protocol stack based on the protocol layer that is in the first protocol stack and is used when the RAT type indication information is obtained.

Optionally, the processor 1010 is configured to control the transceiver 1020 to receive, based on the first RAT, the fourth indication information sent by the first network device and used to indicate the second protocol layer set; and the processor 1010 is configured to determine the second protocol layer set from the second protocol stack based on the fourth indication information.

Optionally, the plurality of types of data correspond to a plurality of pieces of data type information on a one-to-one basis, each piece of data type information can uniquely indicate corresponding data in the plurality of types of data, and the fourth indication information is specifically data type information corresponding to the target data; or a plurality of protocol layers included in the second protocol stack correspond to a plurality of protocol layer identifiers on a one-to-one basis, each protocol layer identifier can uniquely indicate a corresponding protocol layer in the plurality of protocol layers, and the fourth indication information is specifically a protocol layer identifier of the protocol layer included in the second protocol layer set.

It should be understood that, in this embodiment of the present invention, the processor 1010 may be a central processing unit (CPU), or the processor 1010 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

The memory 1030 may include a read-only memory and a random access memory, and provide an instruction and data to the processor 1010. A part of the memory 1030 may further include a non-volatile random access memory. For example, the memory 1030 may further store information about a device type.

The bus system 1040 may further include a power bus, a control bus, a status signal bus, and the like, in addition to a data bus. However, for clear description, various buses in the figure are marked as the bus system 1040.

In an implementation process, each operation of the foregoing method may be completed by using an integrated logic circuit of hardware in the processor 1010 or an instruction in a form of software. The operations of the method disclosed with reference to the embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1030. The processor 1010 reads information in the memory 1030 and completes the operations of the foregoing method in combination with hardware of the processor 1010. To avoid repetition, details are not described again herein.

The units or modules in the device 1000 are respectively configured to perform actions and functions performed by the terminal device in the foregoing method 400. Actions and functions of the first network device are similar to actions and functions of the first network device (for example, the network device # A) in the foregoing method 200. In addition, actions and functions of the second network device are similar to actions and functions of the second network device (for example, the network device # B) in the foregoing method 200. Herein to avoid repetition, detailed descriptions thereof are omitted.

Based on the device for wireless communication in this embodiment of the present invention, the first network device and the second network device that respectively use different radio access technologies to communicate with the terminal device are configured in the communications system; the first network device delivers related data of the second network device to the terminal device; and even if the terminal device cannot directly obtain the data from the second network device, it can still be ensured that the terminal device obtains the data from the first network device. In this way, user experience on the terminal device can be improved.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of embodiments of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention.

What is claimed is:

1. A method for wireless communication, wherein the method comprises:
    negotiating, by a first network device, with a second network device to determine target data, wherein the first network device supports wireless communication based on a first radio access technology (RAT), and the second network device supports wireless communication based on a second RAT; and
    sending, by the first network device based on the first RAT to a terminal device, the target data and RAT type indication information indicating the second RAT; wherein
    the target data comprises at least one of a plurality of types of data as follows:
    radio resource indication information, system information of the second network device, radio resource control (RRC) layer data generated by the second network device, radio link control (RLC) layer data generated by the second network device, or media access control (MAC) layer data generated by the second network device, wherein the radio resource indication information that indicates a target radio resource in radio resources allocated or granted by the second network device, and wherein the target radio resource is used to perform wireless communication based on the second RAT between the terminal device and the second network device, wherein a second protocol stack used to perform wireless communication based on the second RAT is provided in the second network device and the terminal device, the target data is generated by the second network device after the second network device performs encapsulation processing by using a second protocol layer set, the second protocol layer set comprising at least one protocol layer in the second protocol stack, and a first protocol stack used to perform wireless communication based on the first RAT is provided in the first network device and the terminal device; and
    before the sending, by the first network device based on the first RAT to the terminal device, the target data and the RAT type indication information, wherein the RAT type indication information indicates the second RAT, the method further comprises:
    receiving, by the first network device, fourth indication information from the second network device, wherein the fourth indication information indicates the second protocol layer set;
    determining, by the first network device, a first protocol layer set based on the fourth indication information, wherein the first protocol layer set comprises at least one protocol layer in the first protocol stack; and
    performing, by the first network device, encapsulation processing on the target data based on the first protocol layer set.

2. The method according to claim 1, wherein when the target data comprises the radio resource indication information, the negotiating, by the first network device, with the second network device comprises:
    receiving, by the first network device, first indication information from the second network device, wherein the first indication information indicates the radio resources allocated or granted by the second network device;
    determining, by the first network device based on the first indication information, the target radio resource from the radio resources allocated or granted by the second network device; and
    generating, by the first network device, the radio resource indication information based on the target radio resource.

3. The method according to claim 1, wherein when the target data comprises the radio resource indication information, the negotiating, by the first network device, with the second network device comprises:
    sending, by the first network device to the second network device, second indication information indicating a data volume of uplink data that the terminal device needs to send to the second network device;
    receiving, by the first network device, third indication information from the second network device based on the second indication information, wherein the third indication information indicates the target radio resource; and
    generating, by the first network device, the radio resource indication information based on the third indication information.

4. The method according to claim 1, wherein before the sending, by the first network device based on the first RAT to the terminal device, the target data and the RAT type indication information indicating the second RAT, the method further comprises:
    performing, by the first network device based on the first protocol layer set, encapsulation processing on the RAT type indication information indicating the second RAT.

5. The method according to claim 1, wherein the method further comprises:
    sending, by the first network device based on the first RAT, the fourth indication information to the terminal device.

6. The method according to claim 1, wherein the plurality of types of data correspond to a plurality of pieces of data type information on a one-to-one basis, each piece of data type information uniquely indicates corresponding data in the plurality of types of data, and the fourth indication information is data type information corresponding to the target data; or
a plurality of protocol layers in the second protocol stack correspond to a plurality of protocol layer identifiers on a one-to-one basis, each protocol layer identifier uniquely indicates a corresponding protocol layer in the plurality of protocol layers, and the fourth indication information is a protocol layer identifier of a protocol layer in the second protocol layer set.

7. A method for wireless communication, wherein the method comprises:
negotiating, by a second network device, with a first network device, so that the first network device determines target data and sends the target data to a terminal device, wherein the first network device supports wireless communication based on a first radio access technology (RAT), and the second network device supports wireless communication based on a second RAT; wherein
the target data comprises at least one of a plurality of types of data as follows:
radio resource indication information, system information of the second network device, radio resource control (RRC) layer data generated by the second network device, radio link control (RLC) layer data generated by the second network device, or media access control (MAC) layer data generated by the second network device, wherein the radio resource indication information indicates a target radio resource in radio resources allocated or granted by the second network device, and wherein the target radio resource is used to perform wireless communication based on the second RAT between the terminal device and the second network device, wherein a second protocol stack used to perform wireless communication based on the second RAT is provided in the second network device and the terminal device; and
the negotiating, by the second network device, with the first network device comprises:
determining, by the second network device, a second protocol layer set, wherein the second protocol layer set comprises at least one protocol layer in the second protocol stack;
performing, by the second network device, encapsulation processing based on the second protocol layer set to generate the target data; and
sending, by the second network device to the first network device, the target data and fourth indication information, wherein the fourth indication information indicates the second protocol layer set.

8. The method according to claim 7, wherein when the target data comprises the radio resource indication information, the negotiating, by the second network device, with the first network device comprises:
sending, by the second network device to the first network device, first indication information indicating the radio resources allocated or granted by the second network device.

9. The method according to claim 7, wherein when the target data comprises the radio resource indication information, the negotiating, by the second network device, with the first network device comprises:
receiving, by the second network device, second indication information from the first network device, wherein the second indication information indicates a data volume of uplink data that the terminal device needs to send to the second network device;
determining, by the second network device, the target radio resource based on the second indication information; and
sending, by the second network device to the first network device, third indication information indicating the target radio resource.

10. The method according to claim 7, wherein when the target data comprises the radio resource indication information, the method further comprises:
receiving, by the second network device based on the second RAT and by using the target radio resource, the uplink data from the terminal device.

11. The method according to claim 7, wherein the plurality of types of data correspond to a plurality of pieces of data type information on a one-to-one basis, each piece of data type information uniquely indicates corresponding data in the plurality of types of data, and the fourth indication information is data type information corresponding to the target data; or
a plurality of protocol layers in the second protocol stack correspond to a plurality of protocol layer identifiers on a one-to-one basis, each protocol layer identifier uniquely indicates a corresponding protocol layer in the plurality of protocol layers, and the fourth indication information is a protocol layer identifier of the protocol layer in the second protocol layer set.

12. A method for wireless communication, performed in a communications system comprising a first network device and a second network device, wherein the first network device supports wireless communication based on a first radio access technology (RAT), the second network device supports wireless communication based on a second RAT, the method comprising:
receiving, by a terminal device based on the first RAT, target data and RAT type indication information from the first network device, wherein the RAT type indication information indicates the second RAT; wherein
the target data comprises at least one of a plurality of types of data as follows:
radio resource indication information, system information of the second network device, radio resource control (RRC) layer data generated by the second network device, radio link control (RLC) layer data generated by the second network device, or media access control (MAC) layer data generated by the second network device, wherein the radio resource indication information comprises an identifier of a target radio resource in radio resources allocated or granted by the second network device, and wherein the target radio resource is used to perform wireless communication based on the second RAT between the terminal device and the second network device;
determining, by the terminal device based on the RAT type indication information, a second protocol stack corresponding to the second RAT;
determining, by the terminal device, a second protocol layer set from the second protocol stack, wherein the second protocol layer set comprises at least one protocol layer in the second protocol stack; and
performing, by the terminal device, decapsulation processing on the target data based on a first protocol layer set and the second protocol layer set, wherein the first protocol layer set comprises at least one protocol layer in a first protocol stack corresponding to the first RAT.

13. The method according to claim 12, wherein when the target data comprises the radio resource indication information, the method further comprises:
   determining, by the terminal device, the second RAT based on the RAT type indication information; and
   sending, by the terminal device based on the second RAT and by using the target radio resource, uplink data to the second network device.

14. The method according to claim 12, wherein the determining, by the terminal device, the second protocol layer set from the second protocol stack comprises:
   determining, by the terminal device, the second protocol layer set from the second protocol stack based on the protocol layer that is in the first protocol stack and is used when the RAT type indication information is obtained.

15. The method according to claim 12, wherein the determining, by the terminal device, the second protocol layer set from the second protocol stack comprises:
   receiving, by the terminal device based on the first RAT, fourth indication information sent by the first network device and used to indicate the second protocol layer set; and
   determining, by the terminal device, the second protocol layer set from the second protocol stack based on the fourth indication information.

16. The method according to claim 15, wherein the plurality of types of data correspond to a plurality of pieces of data type information on a one-to-one basis, each piece of data type information uniquely indicates corresponding data in the plurality of types of data, and the fourth indication information is data type information corresponding to the target data; or
   a plurality of protocol layers in the second protocol stack correspond to a plurality of protocol layer identifiers on a one-to-one basis, each protocol layer identifier uniquely indicates a corresponding protocol layer in the plurality of protocol layers, and the fourth indication information is a protocol layer identifier of the protocol layer in the second protocol layer set.

\* \* \* \* \*